United States Patent
Sasaki

(10) Patent No.: US 8,131,070 B2
(45) Date of Patent: Mar. 6, 2012

(54) COLOR PROCESSING APPARATUS, COLOR PROCESSING METHOD, COMPUTER READABLE MEDIUM AND COMPUTER DATA SIGNAL

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1031 days.

(21) Appl. No.: 11/819,419

(22) Filed: Jun. 27, 2007

(65) Prior Publication Data

US 2008/0112611 A1   May 15, 2008

(30) Foreign Application Priority Data

Nov. 14, 2006 (JP) .............................. P2006-307929

(51) Int. Cl.
    *G06K 9/36* (2006.01)
(52) U.S. Cl. ......... 382/166; 382/167; 382/178; 358/2.1; 358/501; 358/515; 358/518
(58) Field of Classification Search .......... 382/162–167, 382/278; 358/2.1, 501, 515, 518
    See application file for complete search history.

(56) References Cited

U.S. PATENT DOCUMENTS

| | | | | |
|---|---|---|---|---|
| 5,579,031 A * | 11/1996 | Liang | ............................ | 345/604 |
| 5,596,428 A * | 1/1997 | Tytgat et al. | ................... | 358/518 |
| 5,724,442 A * | 3/1998 | Ogatsu et al. | ................. | 382/167 |
| 5,731,988 A * | 3/1998 | Zandi et al. | ..................... | 382/167 |
| 5,907,415 A * | 5/1999 | Yabe | ............................... | 358/518 |
| 6,014,457 A * | 1/2000 | Kubo et al. | ..................... | 382/167 |
| 6,101,272 A * | 8/2000 | Noguchi | ......................... | 382/167 |
| 6,160,644 A * | 12/2000 | Lin | .................................. | 358/518 |
| 6,388,674 B1 * | 5/2002 | Ito et al. | ......................... | 345/590 |
| 6,480,299 B1 * | 11/2002 | Drakopoulos et al. | ......... | 358/1.9 |
| 6,560,356 B1 * | 5/2003 | Takahashi et al. | ............ | 382/162 |
| 6,693,726 B2 * | 2/2004 | Childs et al. | .................... | 358/2.1 |
| 6,724,507 B1 * | 4/2004 | Ikegami et al. | ................ | 358/518 |
| 6,927,876 B1 | 8/2005 | Kondo | ............................ | 358/1.9 |
| 6,954,287 B1 * | 10/2005 | Balasubramanian et al. | . | 358/1.9 |
| 7,843,465 B1 * | 11/2010 | Shaick | ........................... | 345/600 |
| 2002/0029715 A1 * | 3/2002 | Ogatsu et al. | .................. | 101/494 |
| 2002/0039106 A1 * | 4/2002 | Shimada | ........................ | 345/604 |
| 2002/0159081 A1 * | 10/2002 | Zeng | ............................... | 358/1.9 |
| 2003/0072018 A1 * | 4/2003 | Sasaki et al. | .................... | 358/1.9 |
| 2003/0165266 A1 * | 9/2003 | Kagawa et al. | ................ | 382/166 |
| 2004/0051886 A1 * | 3/2004 | Sasaki et al. | .................... | 358/1.9 |
| 2005/0036161 A1 | 2/2005 | Sasaki | ............................. | 358/1.9 |
| 2005/0206929 A1 * | 9/2005 | Tsuji | ............................... | 358/1.9 |
| 2006/0170940 A1 * | 8/2006 | Kang et al. | ..................... | 358/1.9 |
| 2007/0146744 A1 * | 6/2007 | Kang et al. | ..................... | 358/1.9 |

FOREIGN PATENT DOCUMENTS

EP  0 674 428 B1  2/2001

(Continued)

*Primary Examiner* — Jayesh A Patel
(74) *Attorney, Agent, or Firm* — Morgan, Lewis & Bockius LLP

(57) ABSTRACT

A color processing apparatus includes an image signal acquisition section, a color component preservation section, a first color conversion section, a color gamut compression section and a second color conversion section. The image signal acquisition section acquires an image signal including an input color signal having predetermined color components. The color component preservation section preserves at least one of the color components of the input color signal as a preserved color component. The first color conversion section converts the input color signal into an intermediate color signal belonging to a first color space. The color gamut compression section performs a color gamut compression for the intermediate color signal using color components of the intermediate color signal and the preserved color component, to generate a compressed color signal. The second color conversion section that converts the compressed color signal into an output color signal belonging to a second color space.

9 Claims, 31 Drawing Sheets

FOREIGN PATENT DOCUMENTS

| | | |
|---|---|---|
| EP | 674428 B1 * | 2/2001 |
| JP | A-2001-119595 | 4/2001 |
| JP | 2002-152543 | 5/2002 |
| JP | 2003-125210 | 4/2003 |
| JP | 2004-112269 | 4/2004 |
| JP | A-2005-45454 | 2/2005 |
| JP | A-2005-64774 | 3/2005 |
| JP | A-2005-123874 | 5/2005 |
| JP | A-2005-260777 | 9/2005 |

* cited by examiner

PRESERVATION RATION OF R

PRESERVATION RATION OF G

PRESERVATION RATION OF B

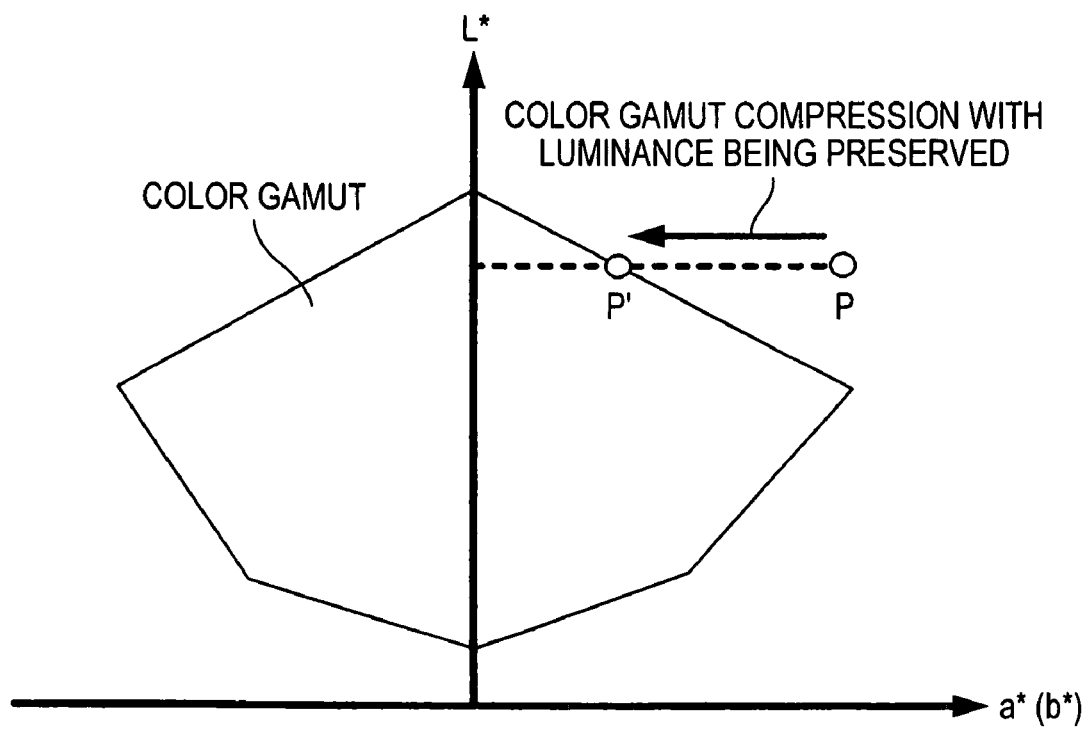

COLOR PROCESSING APPARATUS, COLOR PROCESSING METHOD, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-307929 filed Nov. 14, 2006.

BACKGROUND

1. Technical Field

This invention relates to a color processing apparatus, a color processing method, and a computer readable medium storing a program for causing a computer to perform color conversion of a color signal and a computer data signal.

2. Related Art

For example, it is assumed that another color output device outputs using a color signal of one color output device. In this case, if the both color output devices use color signals in different color spaces, respectively, it is necessary to perform color conversion of the color signals.

At this time, an output color signal of the color output device may be a color signal having larger dimensions than an input color signal. For example, there is the case where the input color signal is L*a*b* and the output color signal is CMYK like a printer.

In such a case, however, the input color signal and the output color signal are different in dimensions and thus do not correspond in a one-to-one manner. Plural combinations of the color components of the output color signal exist. Thus, what color processing is to be performed becomes an issue.

SUMMARY

According to an aspect of the invention, a color processing apparatus includes an image signal acquisition section, a color component preservation section, a first color conversion section, a color gamut compression section and a second color conversion section. The image signal acquisition section acquires an image signal including an input color signal having predetermined color components. The color component preservation section preserves at least one of the color components of the input color signal as a preserved color component. The first color conversion section converts the input color signal into an intermediate color signal belonging to a first color space. The color gamut compression section performs a color gamut compression for the intermediate color signal using color components of the intermediate color signal and the preserved color component, to generate a compressed color signal. The second color conversion section that converts the compressed color signal into an output color signal belonging to a second color space different from the first color space.

BRIEF DESCRIPTION OF THE DRAWINGS

Exemplary embodiments of the invention will be described in detail below with reference to the accompanying drawings, wherein:

FIG. 31 is a schematic representation to show another example of executing the color gamut compression without setting a compression center point.

DETAILED DESCRIPTION

Exemplary embodiment of the invention will be described in detail. However, it should be understood that the invention is not limited to the following exemplary embodiments and various modifications and changes may be made without departing from the spirit and the scope of the invention.

A range of color that can be reproduced by a color output device is called "color gamut," and can be represented by a device-independent color space as typified by a colorimetric color space such as an L*a*b* color system.

FIG. 27 is a drawing to describe the concept of the color gamut.

Figure 27A:
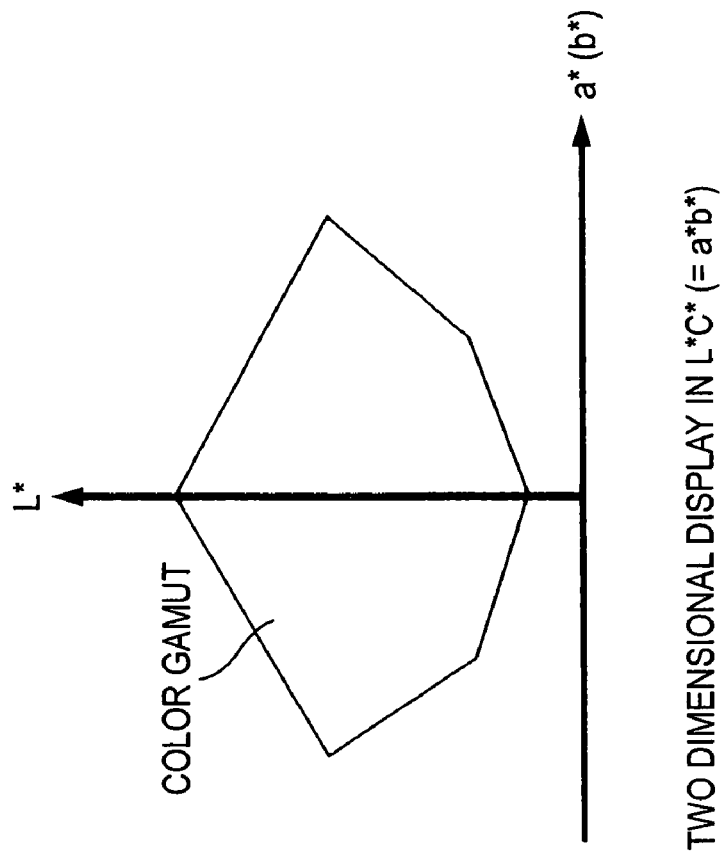
FIG. 27 is a drawing to describe the concept of the color gamut.

FIG. 27A is a drawing to schematically represent the color gamut three-dimensionally using an L* axis, an a* axis, and a b* axis in the L*a*b* color space.

The inside of the color gamut shown in the figure is the range of color that can be reproduced by a color output device.

Figure 27B:
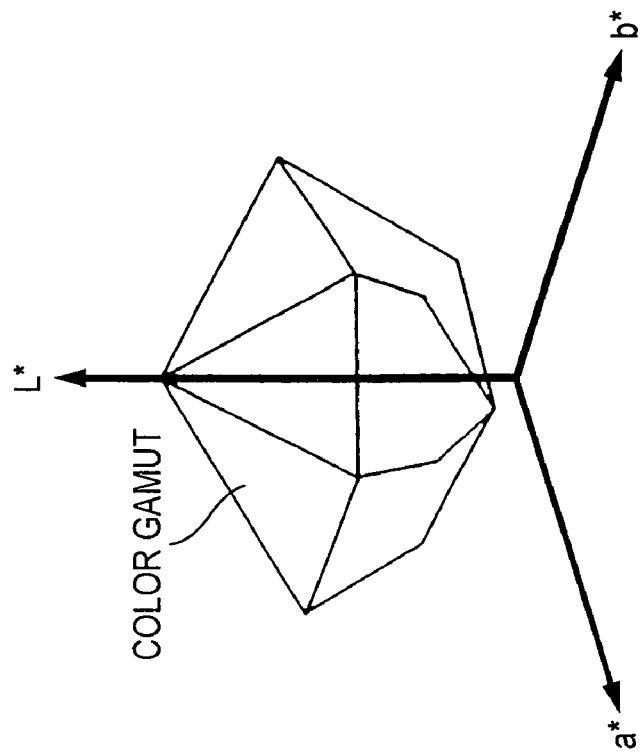

As in FIG. 27B, a* and b* may be put into one dimension and the color gamut may be represented two-dimensionally using the L* axis and the a* (b*) axis, and the a* (b*) axis may be called "C* axis."

In FIG. 27B, when a color represented by one point in the L*a*(b*) color space is reproduced by a color output device, if the point is outside the color gamut, the point needs moving to a point inside the color gamut. Such a process is called "color gamut compression" (or "color gamut mapping").

Figure 28:
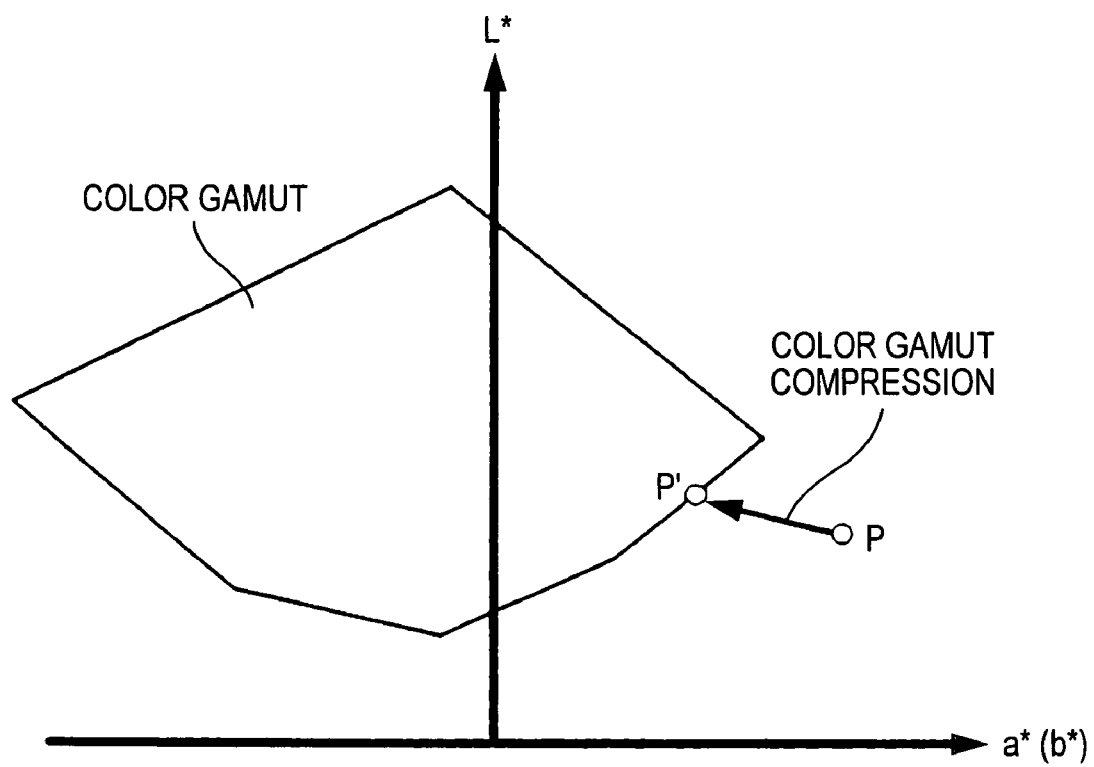
FIG. 28 is a drawing to describe a color gamut compression process.

FIG. 28 is a drawing to describe the color gamut compression process.

FIG. 28 shows an example of moving a point P outside the color gamut to a point P' inside the color gamut by executing the color gamut compression.

For example, one compression center point may be set, and a compression target point is compressed toward the center point.

FIG. 29 is a schematic representation to show one example of executing the color gamut compression by setting a compression center point.

Figure 29B:
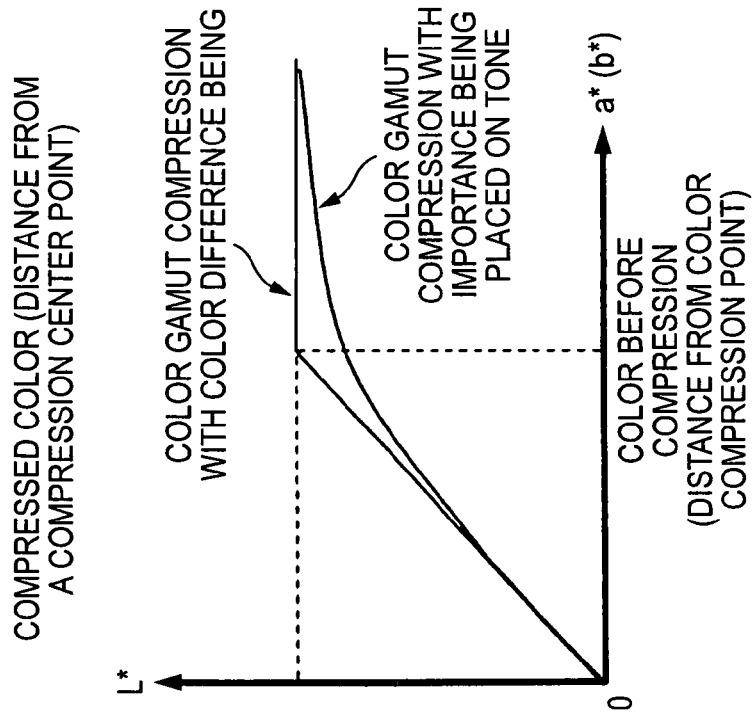
FIG. 29 is a schematic representation to show one example of executing color gamut compression by setting a compression center point.
Figure 29A:
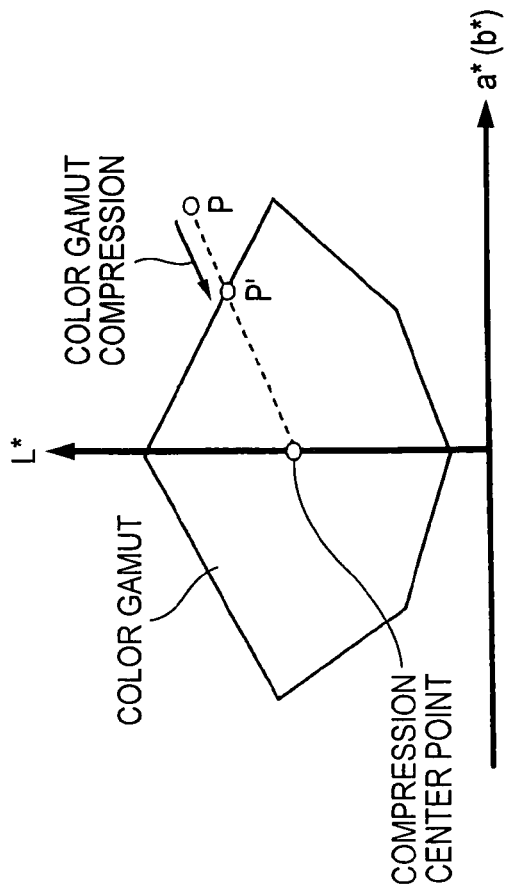

As shown in FIG. 29A, one compression center point is set in the color gamut. The compression center point and the point P outside the color gamut, which is the compression target point, are connected by a line. An intersection point between the line and the color gamut contour is adopted as a point P' to which the point P is moved by the color gamut compression.

In this case, a method of executing the color gamut compression so as to minimize the color difference or a method of executing the color gamut compression so as to smooth the post-compressed color with importance placed on tone are available as shown in FIG. 29B.

A method of executing the color gamut compression without setting a compression center point is also available.

Figure 30:
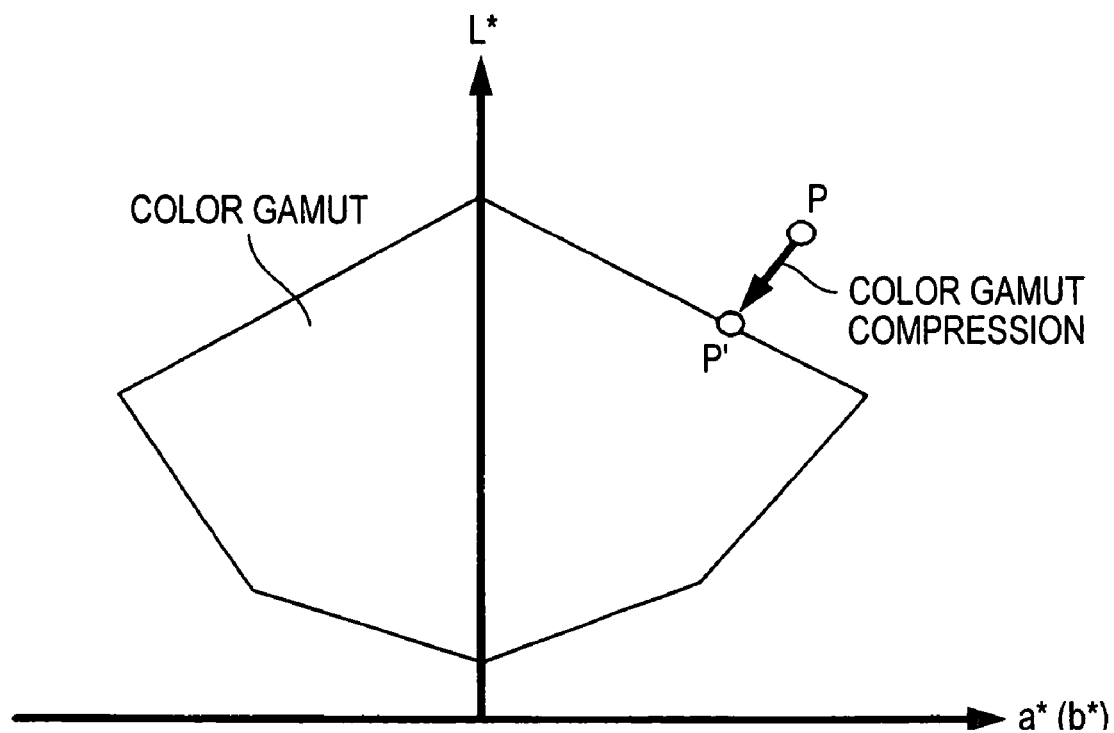
FIG. 30 is a schematic representation to show one example of executing the color gamut compression without setting a compression center point.

FIG. 30 is a schematic representation to show one example of executing the color gamut compression without setting a compression center point.

According to this method, the point P outside the color gamut, which is the compression target point, is compressed in a direction in which a distance between the compression target point and the color gamut contour becomes minimum, and an intersection point with the color gamut contour is adopted as a point P' to which the compression target point P is moved by the color gamut compression.

FIG. 31 is a schematic representation to show another example of executing the color gamut compression without setting a compression center point.

In this method, while lightness (L*) is preserved, the point P outside the color gamut, which is the compression target point, is compressed toward a point in the color gamut which is closest to the point P, and an intersection point with the color gamut contour is adopted as a point P' to which the point P is moved by the color gamut compression.

Several variations of the color gamut compression are available as described above. The color gamut compression is executed for an input color signal. Color conversion is performed the resultant color signal into an output color signal of a color output device (for example, RGB if the color output device is a display device; CMY, CMYK, or the like if the color output device is a printer). Then, color reproduction is performed.

At this time, if the output color signal of the color output device is a color signal having larger dimension than that of the input color signal, the input color signal and the output color signal do not correspond in a one-to-one manner because the input color signal and the output color signal are different in dimension. Plural combinations of the color components of the output color signal would exist for a single input color signal. Thus, for example, a method of determining one of the color components of the output color signal in advance and then determining all color components of the output color signal from the color components of the input color signal and the previously determined color component of the output color signal is available.

Figure 1:
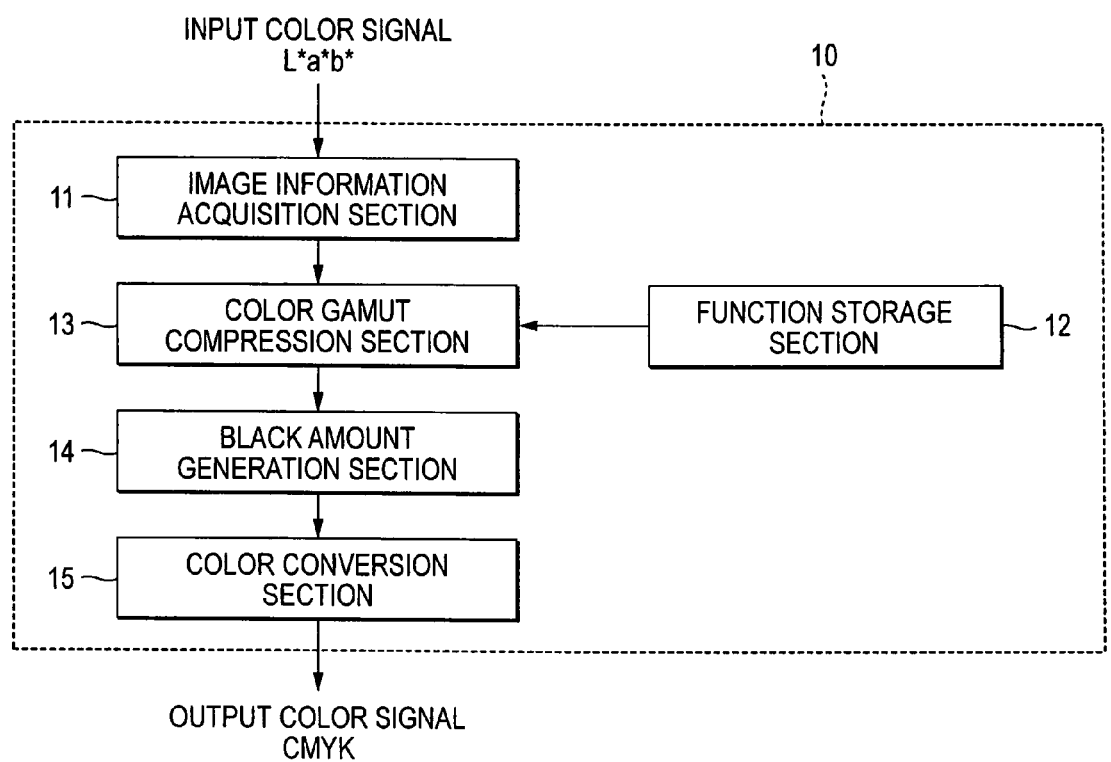
FIG. 1 is a block diagram to show the functions of a color processing apparatus for executing color conversion when the color components of an input color signal are L*a*b* and the color components of an output color signal are CMYK.

FIG. 1 shows an example of a color processing apparatus in such a case. FIG. 1 is a block diagram to show the functions of the color processing apparatus for executing color conversion when the color components of an input color signal are L*a*b* and the color components of an output color signal are CMYK.

Figure 2:
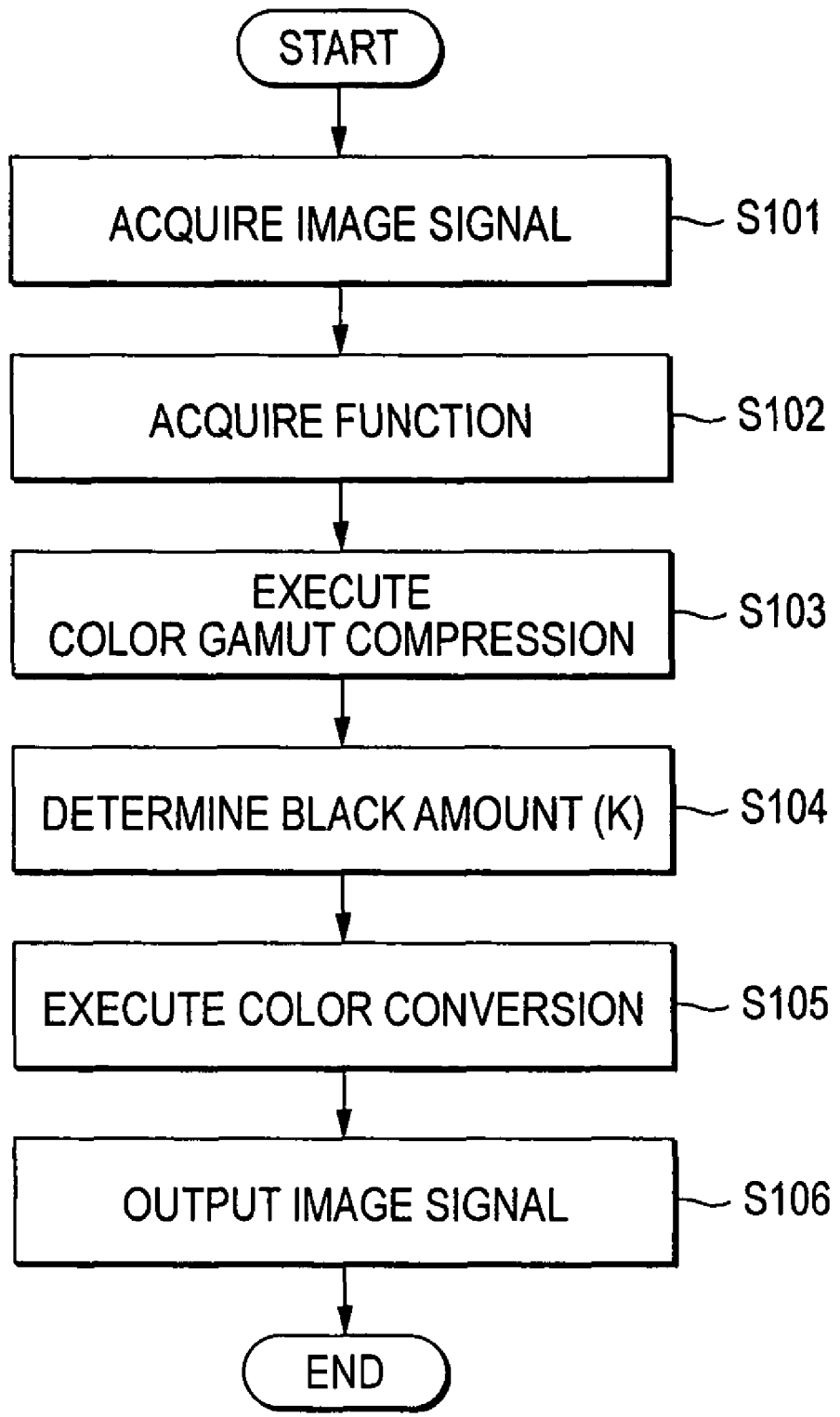
FIG. 2 is a flowchart to show the operation of a color processing apparatus 10.

FIG. 2 is a flowchart to show the operation of the color processing apparatus 10.

The color processing apparatus 10 shown in FIG. 1 includes an image information acquisition section 11 that acquires an image signal having a predetermined input color signal from an external computer (not shown), for example. The color processing apparatus 10 also includes a function storage section 12 that stores a function for use in the color gamut compression and a color gamut compression section 13 that executes the color gamut compression to generate a compressed color signal. The color processing apparatus 10 further includes a black amount generation section 14 that determines black amount (K) and a color conversion section 15 that converts from the compressed color signal and the black amount (K) into a predetermined output color signal.

The image information acquisition section 11 acquires the image signal having the predetermined input color signal from the external computer as described above (step 101). Here, it is assumed that an L*a*b* color signal is acquired as the input color signal.

A control section (not shown) reads a function for use in executing the color gamut compression from the function storage section 12 (step 102). The color gamut compression section 13 executes the color gamut compression according to any of the methods as shown in FIGS. 29 to 31 described above (step 103).

Next, conversion to CMYK, which are the color components of the output color signal, is executed. To uniquely determine the CMYK color signal having higher dimension than that of the L*a*b* color signal, a procedure of first determining the black amount (K) and calculating CMY from L*a*b* and K is adopted.

The black amount generation section 14 can determine K based on an association between L*a*b* and K as described below.

First, a corresponding adjustment K amount is calculated from a representative color signal L*a*b*, and color modeling to predict an optimum K amount is performed from plural sets of the representative color signal L*a*b* and the adjustment K amount. At this time, extrapolation prediction of the whole color gamut is performed based on colors in a partial color gamut. Thereby, the optimum K amount to enable natural color reproduction can be predicted (step 104).

The color conversion section 15 converts from L*a*b* and K into CMY. This color conversion can use a color conversion model based on a neural network learning the association between CMYK and L*a*b*, and CMY may be calculated according to its inverse conversion model (conversion from L*a*b*K to CMY) (step 105).

Finally, an output color signal which is an image signal is output (step 106).

The color processing apparatus can provide the output color signal by executing the color gamut compression in the L*a*b* color space once.

Further, if a total amount of CMYK is controlled (for example, each of C, M, Y, and K color materials is represented by dot values in a range of 0% to 100% and such control that a total amount value C+M+Y+K≦320%, etc., is applied), the above color processing apparatus can deal with this control.

That is, K for making it possible to make full use of the color gamut in the range of the total amount control value of CMYK may be determined, and the color gamut compression may be executed as compression into the maximum color gamut that can be represented within the total amount control value of CMYK.

In the color processing, a user may want to preserve K (K plate), which is the black amount.

In such a case, a color processing apparatus for executing color conversion while preserving the K plate by matching L* values when an amount of only a K color is changed.

Figure 3:
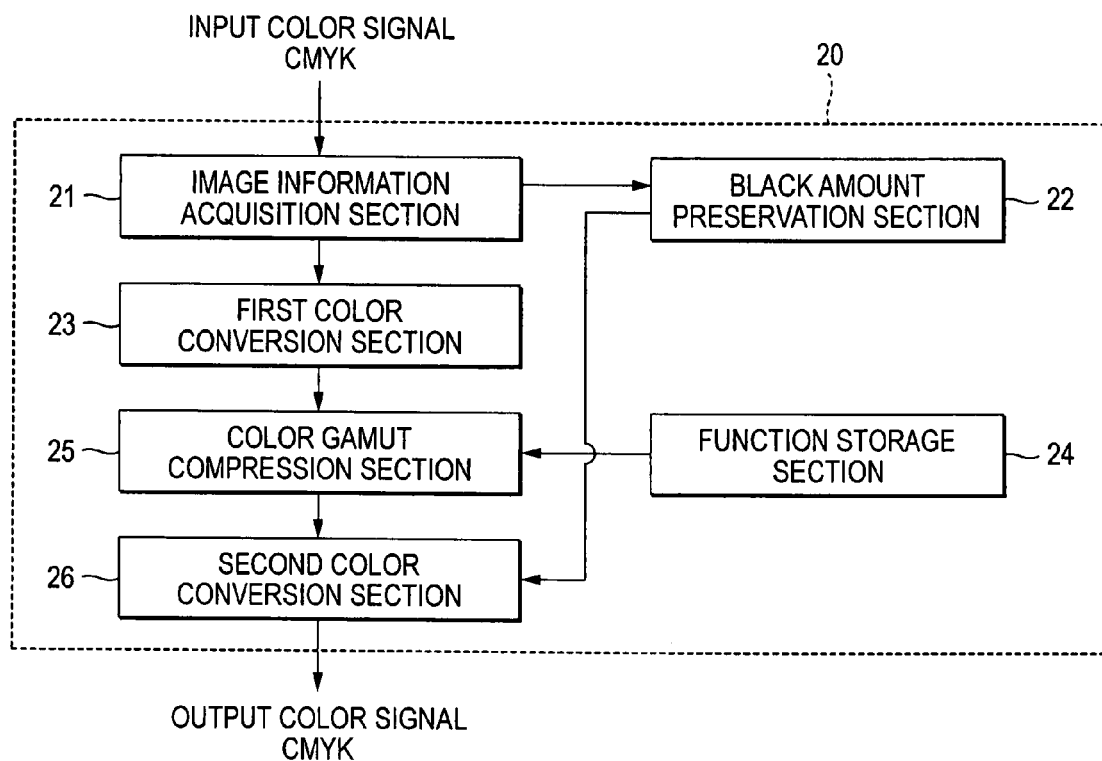
FIG. 3 is a block diagram to show the functions of a color processing apparatus for executing color conversion while preserving K plate as much as possible when the color components of an input color signal are CMYK of a printing machine and an output color signal is CMYK of a color signal of a printer.

FIG. 3 shows an example of a color processing apparatus in such a case. FIG. 3 is a block diagram to show the functions of the color processing apparatus for executing the color conversion while preserving K plate as much as possible when the color components of an input color signal such as a printing machine are CMYK, and an output color signal is CMYK, which is a color signal of a printer.

Figure 4:
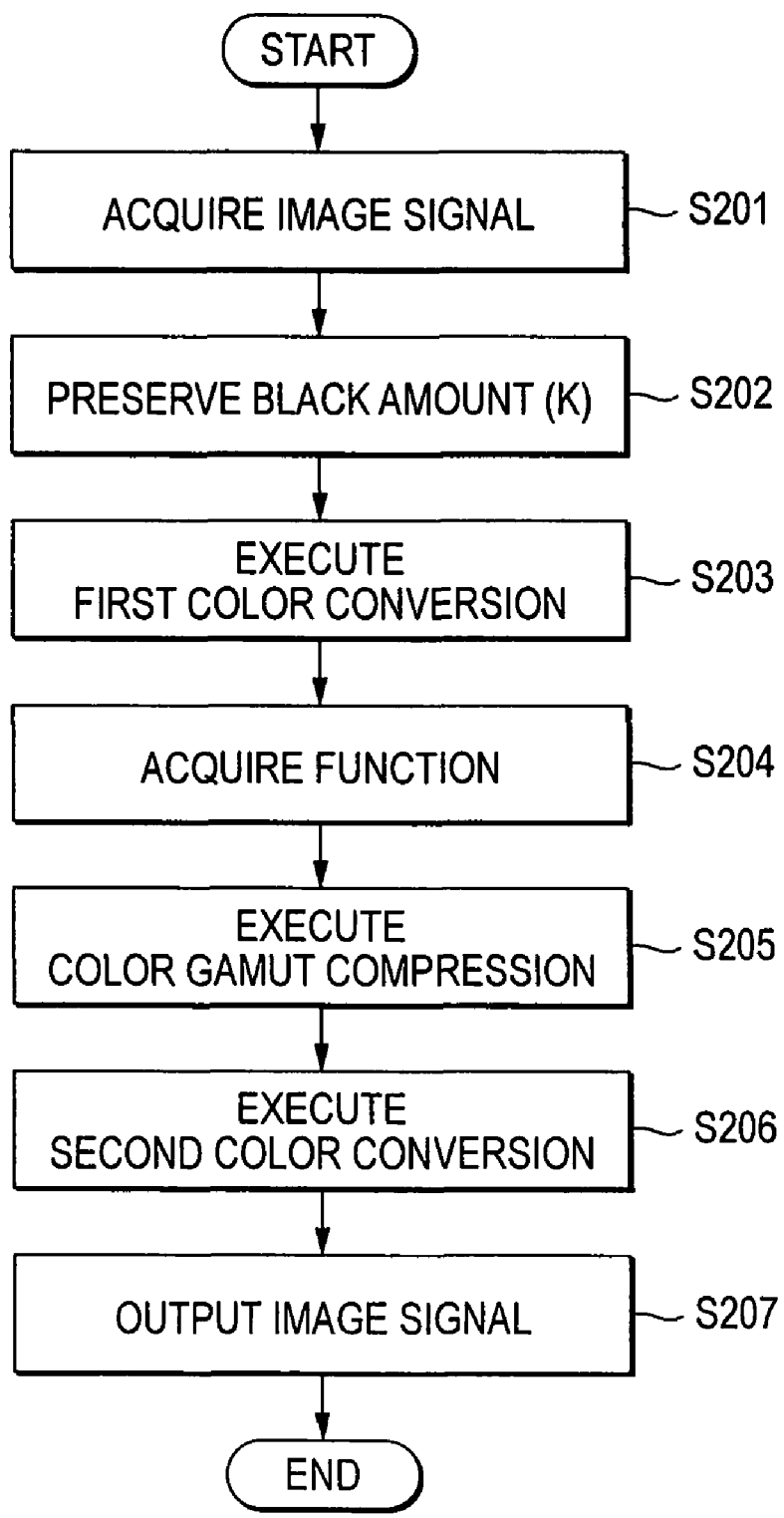
FIG. 4 is a flowchart to show the operation of a color processing apparatus 20.

FIG. 4 is a flowchart to show the operation of a color processing apparatus 20.

The color processing apparatus 20 shown in FIG. 3 includes an image information acquisition section 21 that acquires an image signal having a predetermined input color signal from an external computer (not shown), for example. The color processing apparatus 20 also includes a black amount preservation section 22 that preserves a black amount (K). The color processing apparatus 20 further includes a first color conversion section 23 that executes color conversion for an input color signal including the color components CMYK to a L*a*b* color signal, a function storage section 24 that stores a function for use in executing color gamut compression, a color gamut compression section 25 for executing the color gamut compression for the L*a*b* color signal provided by the first color conversion section 23 to provide a compressed color signal, and a second color conversion section 26 that converts from the compressed color signal and the preserved black amount (K) into an output color signal including color components CMYK.

The image information acquisition section 21 acquires the image signal having the predetermined input color signal from the external computer in a similar manner to that described above (step 201). Here, a color signal including color components CMYK is acquired as the input color signal.

In order for a printer to provide output roughly equivalent to K plate of a printing machine, the black amount preservation section 22 performs a process of preserving the K plate of the printing machine as much as possible and matching the black plate with the characteristic of the printer (step 202).

For example, the K plate is preserved by matching the L* values when an amount of only a K color is changed. K thus obtained is adopted as preserved K.

The first color conversion section 23 calculates L*a*b* corresponding to CMYK of the printing machine. This may be performed by using the color conversion model described above (step 203).

A control section (not shown) reads a function for use in executing the color gamut compression from the function storage section 24 (step 204). If the color signal including the color components of L*a*b* is outside the color gamut, the color gamut compression section 25 executes compression for the color gamut of the printer (step 205).

The second color conversion section 26 executes color conversion of L*a*b* to CMY based on the compressed L*a*b* color components and the preserved K. The second color conversion section 26 finally provides an output color signal including CMYK, which are the color components of the printer (step 206). Then, the second color conversion section 26 outputs the output color signal as an image signal (step 207).

Here, it is guaranteed that L*a*b* after subjected to the color gamut compression can be reproduced in the L*a*b* color space, but the K value is not considered.

FIG. 5 is a schematic representation to represent the color gamut, which can be reproduced by a color output device such as a printer, in the L*a*(b*) color space.

Figure 5A:
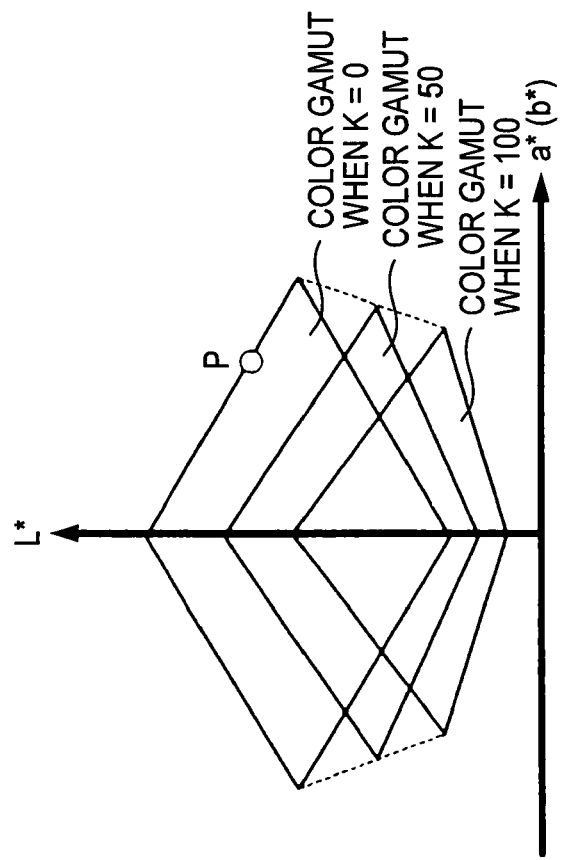
FIG. 5 is a schematic representation to represent a color gamut, which can be reproduced by a color output device such as a printer, in an L*a*(b*) color space.

In FIG. 5A, a point P is L*a*b* in the color gamut, but this color may not be reproduced depending on the K value.

Figure 5B:
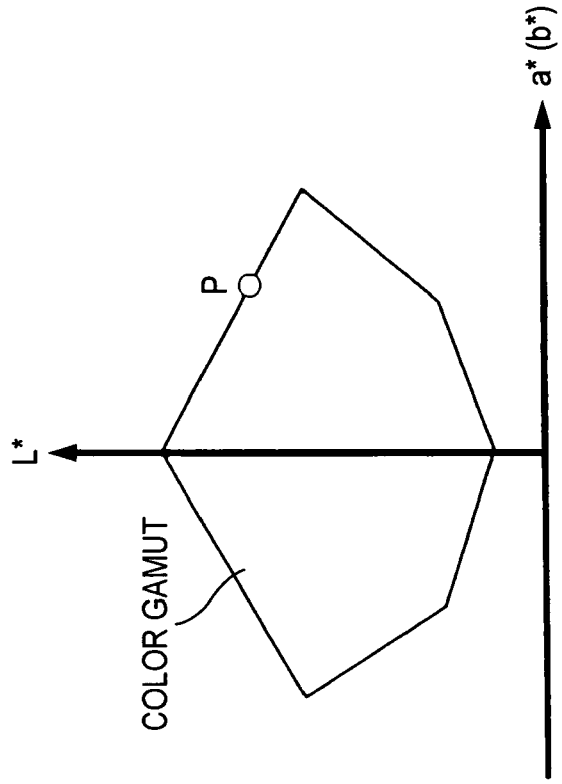

The reason is that the color gamut that can be reproduced changes as the K value changes as shown in FIG. 5B. The color P can be reproduced when K=0. However, the color P becomes outside the color gamut if K=50 is input.

Generally, the K value must exist between Kmax (the maximum K which can reproduce L*a*b*) and Kmin (K required at minimum to reproduce L*a*b*).

Thus, if K to be preserved does not exist in the range of Kmin≦K≦Kmax, finally calculated CMY becomes values outside this range as a color signal.

This means that if C, M, Y, and K color signals are represented by dot values in a range of 0% to 100%, any of C, M, or Y becomes >100% or becomes <0%.

The fact that CMY is outside this range means that the color is outside the color gamut (the color cannot be reproduced) in terms of L*a*b*K even if the color is in the color gamut in terms of L*a*b*.

Thus, it is necessary to perform fine adjustment for placing the CMY value of the color components finally calculated in the range becomes necessary. However, the method of performing post-processing like the fine adjustment only with the CMYK value of the color components of the output color signal does not solve the true nature of this issue and would not be effective.

Further, if the CMYK total amount control value is applied to a printer, this issue would be furthermore complicated.

Conceivable as a method for solving this issue is a method calculating CMY, which is the output color signal, by searching for L*a*b* and K alternately so as to satisfy all of the restrictions of faithful reproduction of L*a*b* and total amount control of CMYK of a printer, for example.

Figure 6:
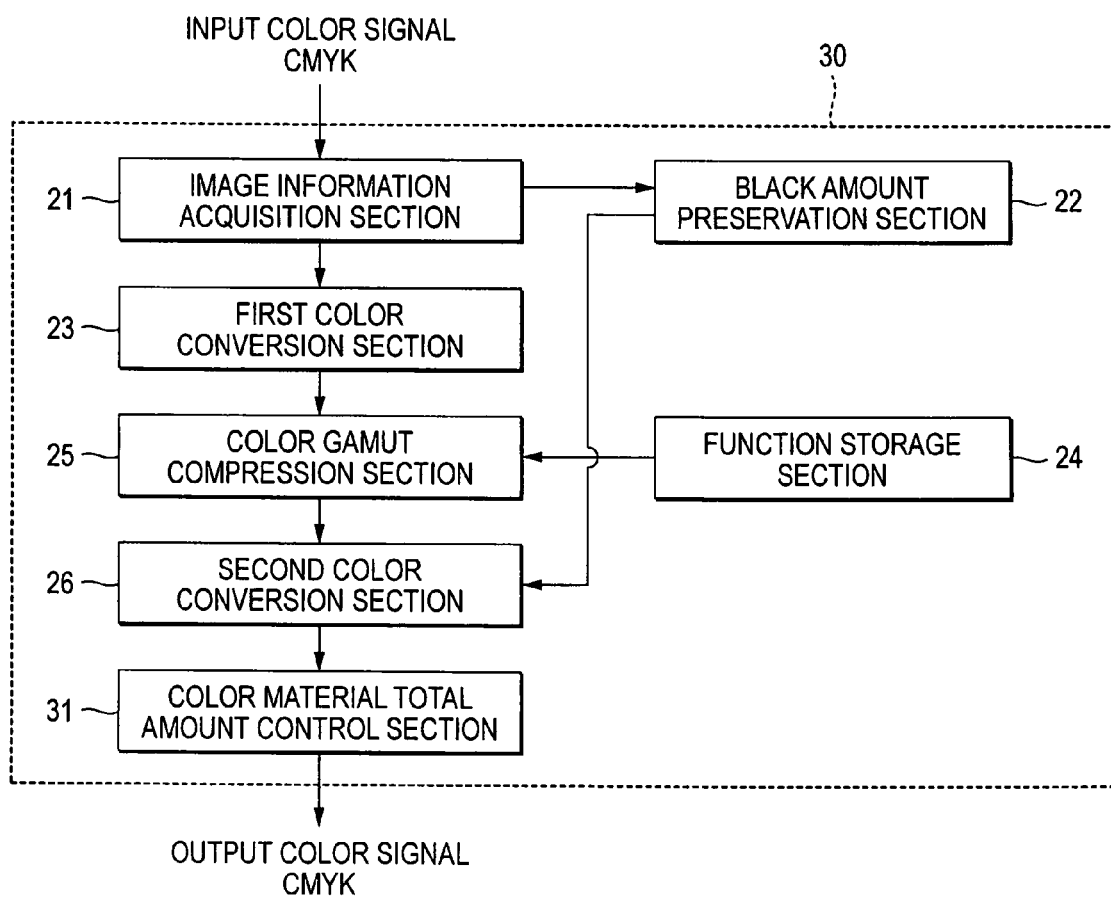
FIG. 6 is a block diagram to show the functions of a color processing apparatus for executing color conversion when the color components of an input color signal of a printing machine are CMYK and the color components of an output color signal of a printer are CMYK.

FIG. 6 shows an example of a color processing apparatus in such a case. FIG. 6 is a block diagram to show the functions of a color processing apparatus for executing color conversion when the color components of an input color signal of a printing machine are CMYK and the color components of an output color signal of a printer are CMYK.

Figure 7:
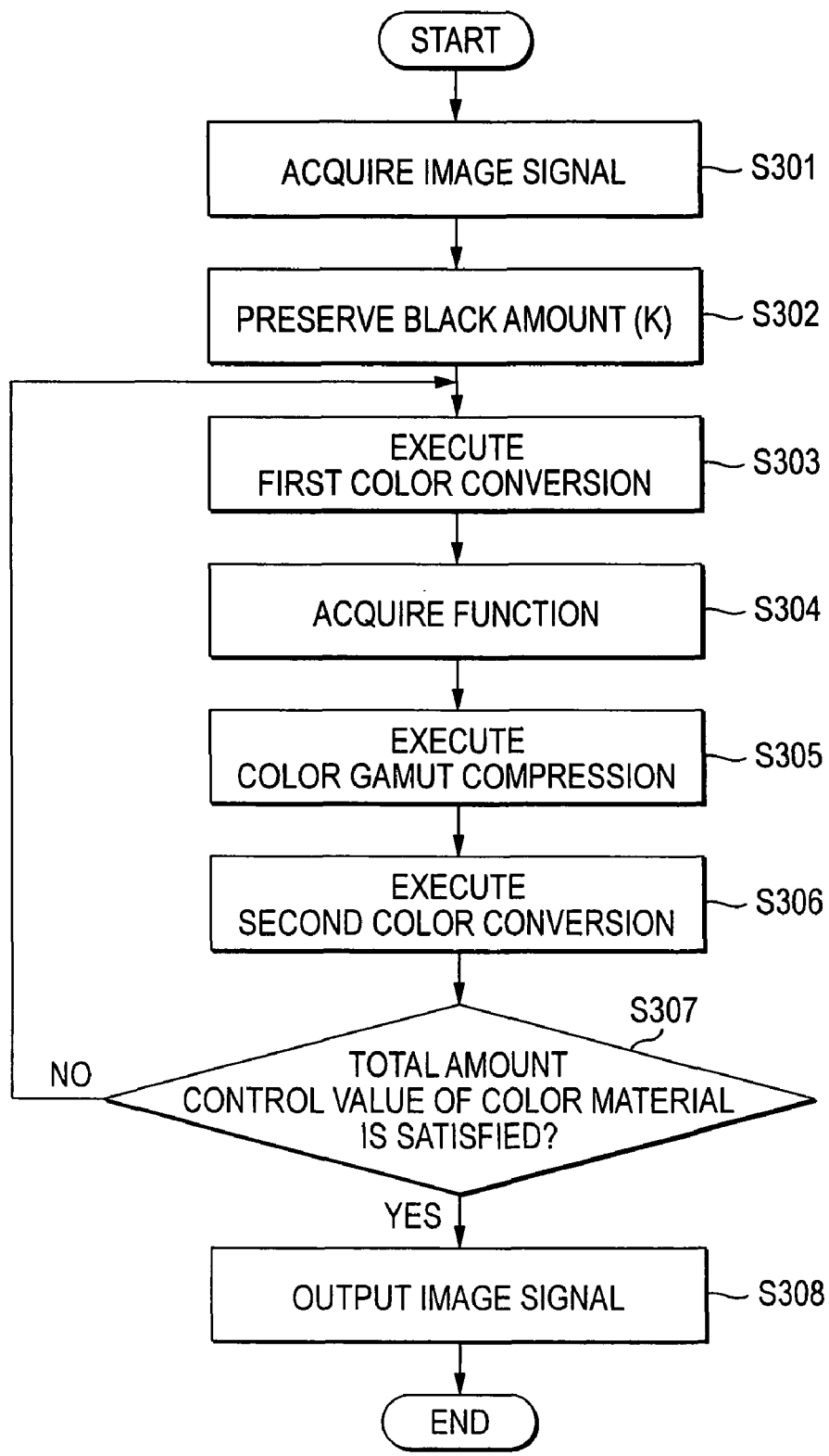
FIG. 7 is a flowchart to show the operation of a color processing apparatus 30.

FIG. 7 is a flowchart to show the operation of a color processing apparatus 30.

The color processing apparatus 30 shown in FIG. 6 is provided by adding a color material total amount control section 31 to the color processing apparatus 20 shown in FIG. 3.

The Processes performed by the sections 21 to 26 in FIG. 6 is similar to those performed by the sections 21 to 26 in FIG. 3. The color material total amount control section 31 determines as to whether or not the total amount of color materials satisfies a predetermined control value (step 307).

If the predetermined control value is satisfied, the signal is output intact as an output color signal (step 308). If the predetermined control value is not satisfied, an L*a*b*K value different from the preceding L*a*b*K value is calculated and it is again determined as to whether or not the total amount of color materials satisfies the predetermined control value.

The process is repeated, whereby L*a*b*K that can be reproduced is calculated. In addition, a search is made so that the CMYK total amount becomes within the total amount control value of a printer, if color conversion of L*a*b*K to CMYK is executed.

In this case, it becomes necessary to perform a process of determining as to whether or not K is appropriate and repeating the search for K and L*a*b* until K becomes appropriate.

However, the processing time taken for the color gamut compression of L*a*b* and searching for K falling within the range of Kmin≦K≦Kmax is enormous.

In recent years, a color output device for providing an output color signal, such as CMYKRGB, which has higher dimension than CMYK and which contains the extra color components such as RGB, has been becoming mainstream.

Thus, a technique that can deal with requirement from color matching, which preserves the extra color components such as RGB, becomes necessary.

However, the method of executing the color gamut compression of L*a*b* and alternately searching for K falling within the range of Kmin≦K≦Kmax is a method that considers preservation of only K and is not a general-purpose method capable of dealing with increase in the special colors.

Further, it is also difficult to expand this method from the viewpoint of the processing time.

Then, in the exemplary embodiments, the above-described issues are solved by the following method.

In the following description in the exemplary embodiments, it is assumed that the color space for representing the color gamut is L*a*b* and that the color space of an output color signal of a color output device is made up of (i) all of C, M, and Y (primary color components) and (ii) any one color component of KRGB (extra color components). However, as for application of the exemplary embodiments, the color space for representing the color gamut and the color components of a color output device are not limited thereto, and the dimension of a color signal do not matter.

Figure 8:
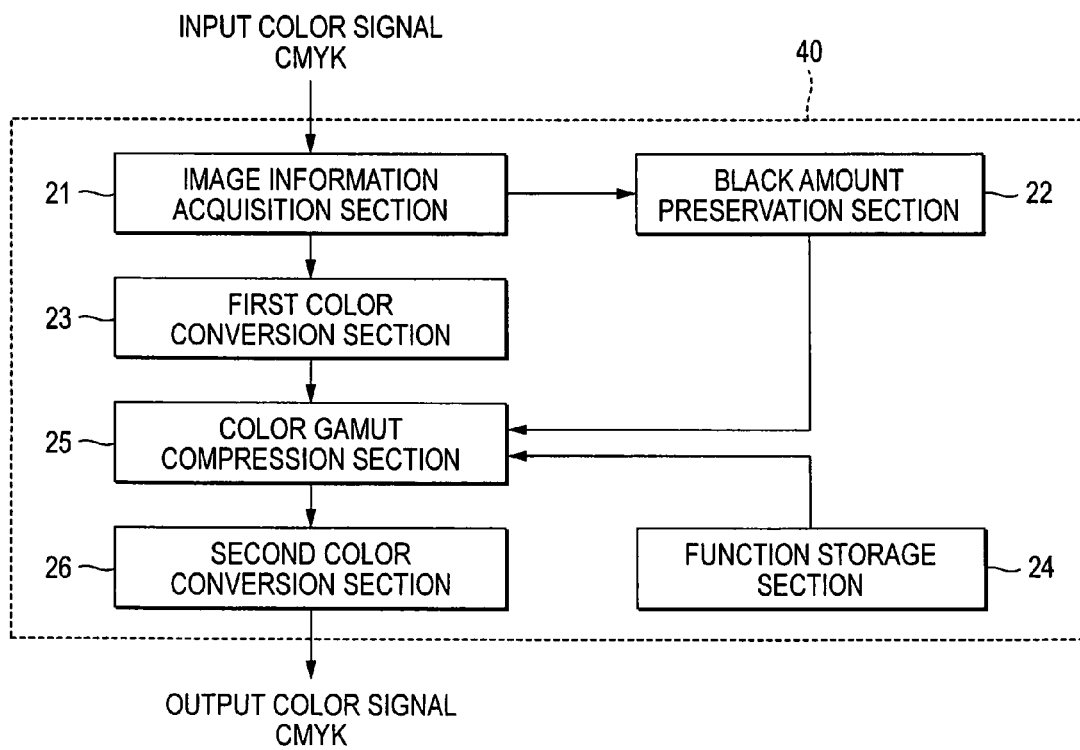
FIG. 8 is a block diagram to show the functions of a color processing apparatus incorporating an exemplary embodiment of the invention.

FIG. 8 is a block diagram to show the functions of a color processing apparatus 40 according to the exemplary embodiment of the invention.

Figure 9:
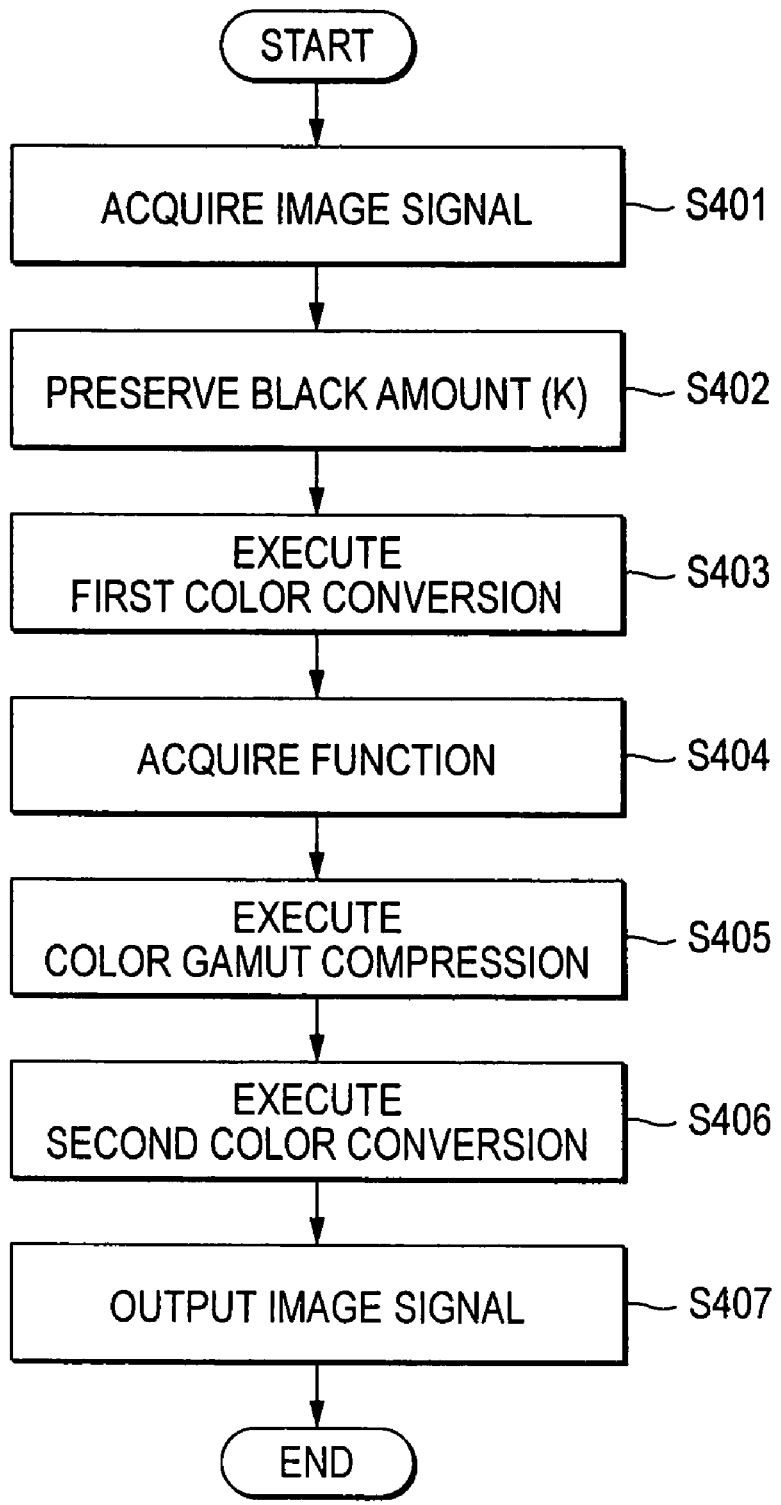
FIG. 9 is a flowchart to show the operation of a color processing apparatus 40.

FIG. 9 is a flowchart to show the operation of the color processing apparatus 40.

The color processing apparatus 40 shown in FIG. 8 includes an image information acquisition section 21 that acquires an image signal having a predetermined input color signal sent from an external computer (not shown), for example. The color processing apparatus 40 also includes a black amount preservation section 22 that preserves a black amount (K). The color processing apparatus 40 further includes a first color conversion section 23 that executes color conversion of an input color signal having color components of CMYK to L*a*b* color signal (an example of an intermediate color signal), a function storage section 24 that stores a function for use in executing the color gamut compression, a color gamut compression section 25 that executes color gamut compression using the L*a*b* color signal provided by the first color conversion section 23 and the black amount (K) preserved in the black amount preservation section 22 to generate a compressed color signal, and a second color conversion section 26 that converts the compressed color signal into an output color signal having color components CMYK.

The image information acquisition section 21 acquires the image signal having the predetermined input color signal from the external computer, in a similar manner to that described above (step 401). Here, it is assumed that a color signal having color components CMYK is acquired as the input color signal.

For a printer to provide output roughly equivalent to K plate of a printing machine, the black amount preservation section 22 performs a process of preserving the K plate of the printing machine as much as possible and matching the K plate with the characteristic of the printer (step 402).

For example, the K plate is preserved by matching the L* values when only a K color is changed. K thus obtained is adopted as preserved K.

The first color conversion section 23 calculates L*a*b* corresponding to CMYK of the printing machine. This may be performed by using the color conversion model described above (step 403).

A control section (not shown) reads a function for use in executing the color gamut compression from the function storage section 24 (step 404). The color gamut compression section 25 adds K to the L*a*b* color space as an axis to form an L*a*b*K color space (an example of a high dimensional color space), and executes the color gamut compression (step 405).

By making a search in the high dimensional color space, L*a*b* color gamut compression by the color gamut compression section 25 in FIG. 6 and a CMYK total amount control process by the color material total amount control section 31 can be performed simultaneously as described later in detail.

The second color conversion section 26 executes color conversion of L*a*b* to CMY using L*a*b* after subjected to the color gamut compression, provides an output color signal having CMYK, which are the color components of the printer, finally (step 406), and outputs the signal as an image signal (step 407).

Figure 10:
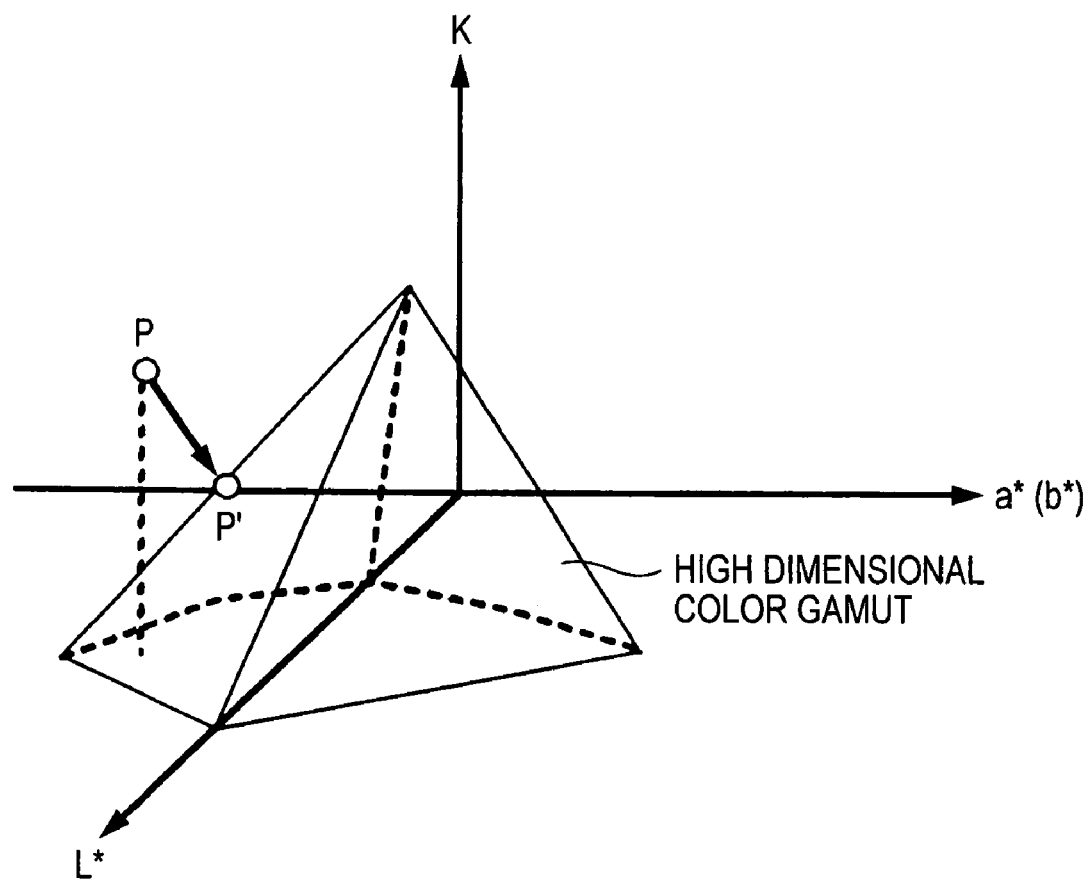
FIG. 10 is a schematic representation to show an example of color gamut compression in a high dimensional color space.

FIG. 10 is a schematic representation to show an example of the color gamut compression in the high dimensional color space.

FIG. 10 shows a state where the color gamut compression is executed for a point P outside the color gamut, toward a point P' in the color gamut in the L*a*b*K color space, which is the high dimensional color space.

For convenience of the description, a* and b* are put into a*(b*) and therefore the color gamut is substantially in a four-dimensional color space.

In this case, a point where a perpendicular line to L*a*(b*) from the point P and the L*a*(b*) plane intersect each other is within the color gamut when viewed only from L*a*(b*). Therefore, it is seen that the point P is outside the color gamut because K is inappropriate.

The color gamut compression performed in the high dimensional color space may be any so long as it is a mapping to a point falling within the color gamut in the high dimensional color space.

Figure 11:
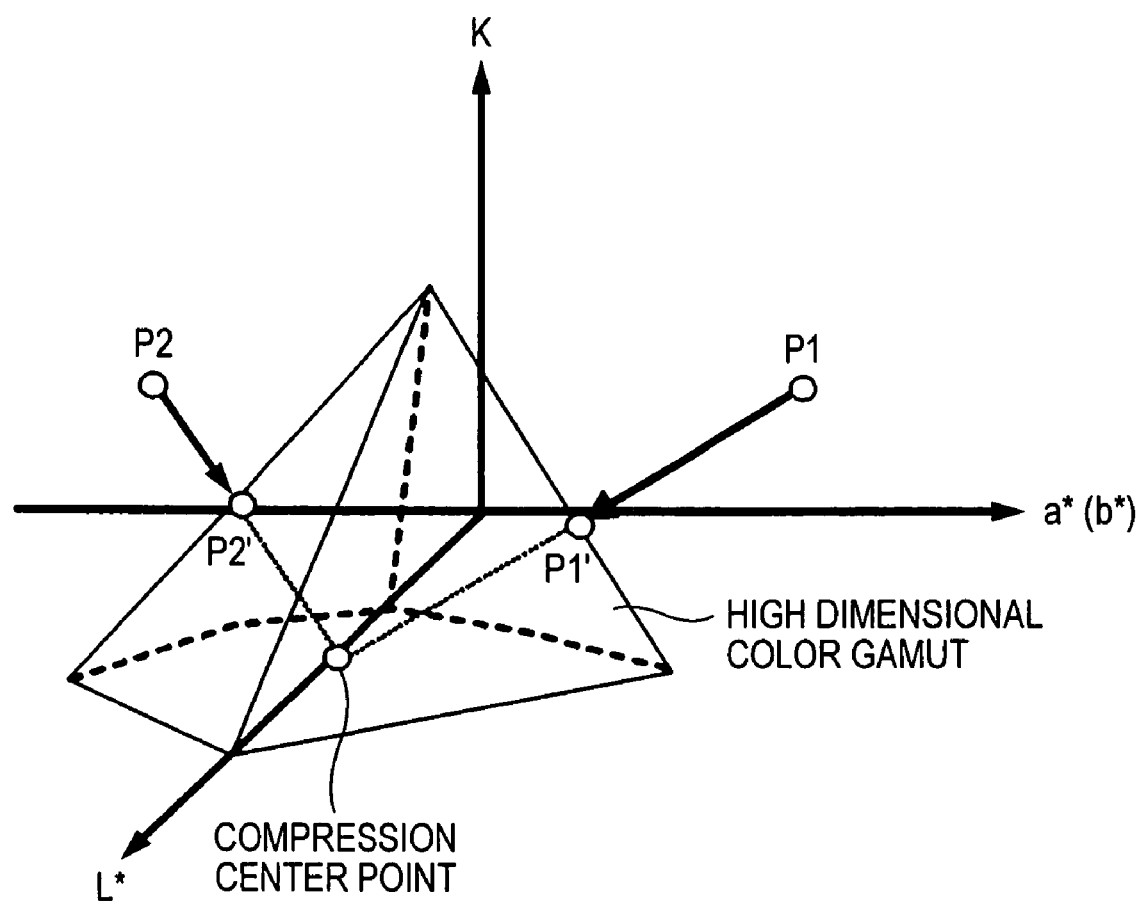
FIG. 11 is a schematic representation for setting one compression center point in an L*a*(b*)K color space and moving a point along a line extending from a compression target point toward the compression center point, to thereby execute the color gamut compression.

FIG. 11 is a schematic representation for setting one compression center point in the L*a*(b*)K color space and moving a point along a line extending from a compression target point toward the compression center point, to thereby execute the color gamut compression.

In each of color gamut compression from a point P1 to a point P1' and color gamut compression from a point P2 to a point P2', a compression center point in the high dimensional color gamut is set, the compression center point and the compression target point are connected by a line, and the intersection point between the line and the color gamut contour is adopted as a point to which the compression target point is moved by the color gamut compression.

Actually, for example, the compression center point is set to $(L_0, a_0, b_0, K_0)$, this point is moved on a line represented below, and the intersection point between the line and the color gamut contour is found, whereby the color gamut compression can be executed.

$$\begin{cases} L^* = L_o + \alpha_L t \\ a^* = a_o + \alpha_a t \\ b^* = b_o + \alpha_b t \\ K = K_o + \alpha_K t \end{cases} \quad (1)$$

where t denotes a parameter to represent the line, and $(\alpha_L, \alpha_a, \alpha_b, \alpha_K)$ denote a directional vector from the compression center point toward the compression target point.

It is assumed that the expression (1) represents the compression center point when t=0 and that the expression (1) represents the compression target point when t=1. In this case, the intersection point between the line represented by the expression (1) and the color gamut contour should exist between 0 and 1 in terms of t. The intersection point is found and adopted as a point to which the compression target point is moved by the color gamut compression.

As a specific method of finding t, letting a color conversion model between CMYK and L*a*b* be F, $$(L^*, a^*, b^*) = F(C, M, Y, K) \quad (2)$$

An inverse conversion model, $F^{-1}$, is represented as follows.

$$(C, M, Y) = F^{-1}(L^*, a^*, b^*, K) \quad (3)$$

As t is changed, L*a*b* is changed. t at which CMY calculated by the expression (3) falls within the range of the color signal is a point inside the color gamut, and the point closest to the compression target point P is the intersection point between the line represented by the expression (1) and the color gamut.

For example, binary search may be used as a search for t, but any search may be used in this exemplary embodiment.

In the search method for executing search for L*a*b* and search for K alternately in the related art, the search is repeated until the both L*a*b* and K converge. In this exemplary embodiment, however, the color gamut compression is executed at a stroke in the high dimensional color space and thus searching may be executed smaller number of times.

Further, if total amount control is applied to CMYK, the search for t may be executed so that CMY obtained according to the expression (3) satisfies $$C + M + Y + K = T \quad (4)$$

(if the total amount control is applied, the color gamut shape should be smaller than the color gamut shape shown in FIG. 11, of course).

Here, it is assumed that T is the total amount control value of CMYK imposed on the printer, using the output color signal.

The compression direction may also be changed in response to a position of the compression target point.

Figure 12:
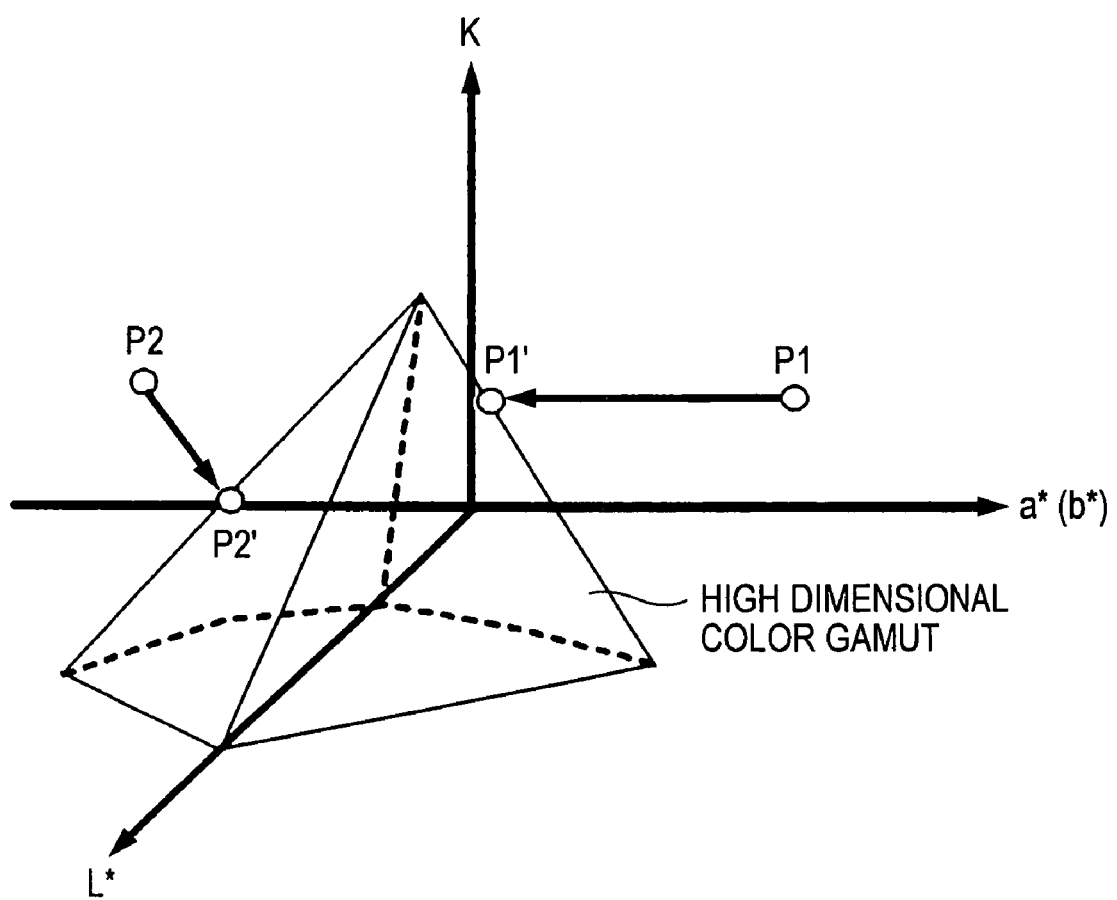
FIG. 12 is a drawing to describe the color gamut compression when the compression direction is changed according to a position of the compression target point

FIG. 12 is a drawing to describe color gamut compression when the compression direction is changed according to the position of the compression target point.

Actually, the compression direction may be changed by changing a function for executing color gamut compression in accordance with the position of the compression target point.

Here, the color gamut compression from a point P1 to a point P1' is an example of executing the color gamut compression with K being maintained. The color gamut compression from a point P2 to a point P2' shows an example of executing the color gamut compression with L*a*b* and K being preserved with good balance.

The compression center point may be changed in accordance with a position of the compression target point.

Figure 13:
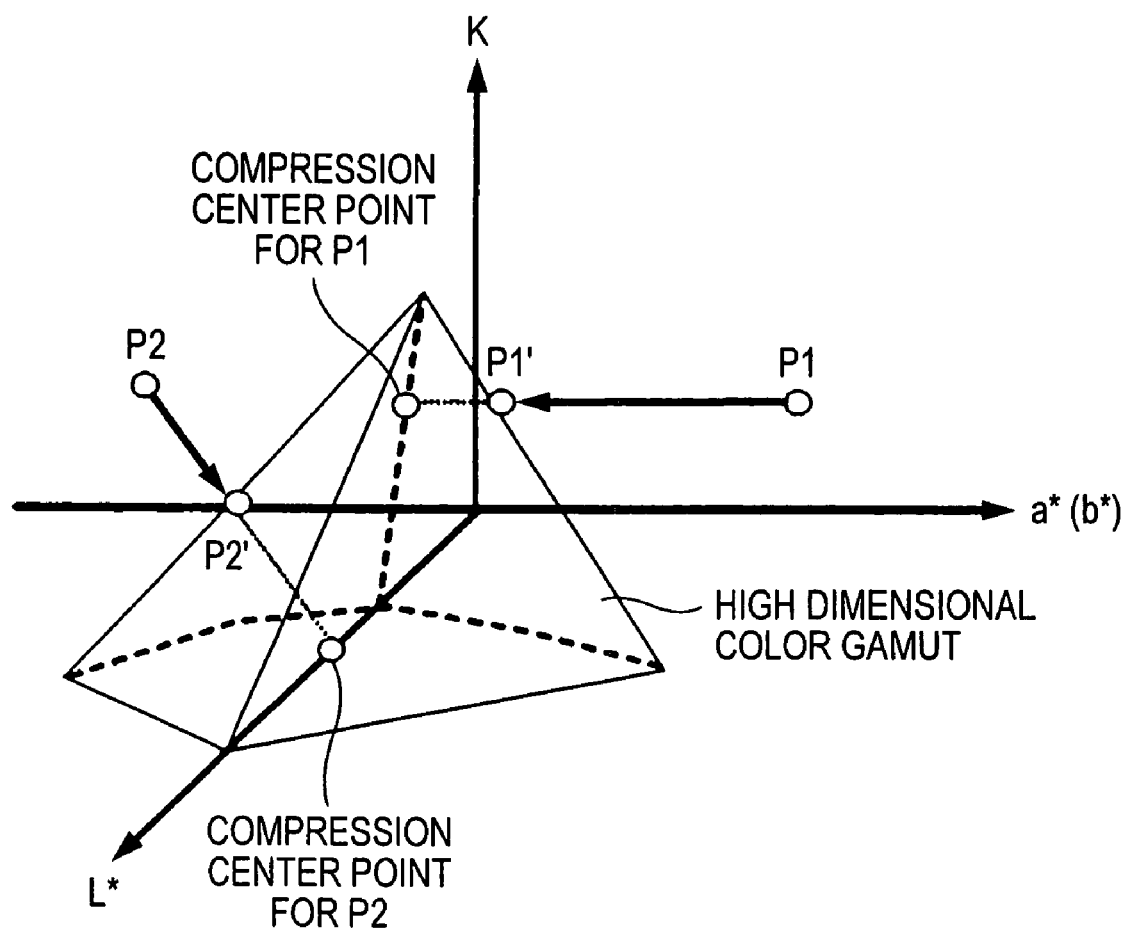
FIG. 13 is a schematic representation to show the color gamut compression when the compression center point is changed according to the position of the compression target point.

FIG. 13 is a schematic representation to show color gamut compression when the compression center point is changed according to the position of the compression target point.

Also in this case, actually, the compression center point may be changed by changing a function for executing color gamut compression in accordance with the position of the compression target point.

The color gamut compression from a point P1 to a point P1' is an example of executing the color gamut compression with K being maintained. The color gamut compression from a point P2 to a point P2' shows an example of executing the color gamut compression with L*a*b* and K being preserved with good balance.

Thus, the compression direction may be changed in accordance with the L*a*b* value and the K amount.

On the other hand, importance may be placed on matching appearance rather than preservation of K depending on the color to be reproduced.

Figure 14:
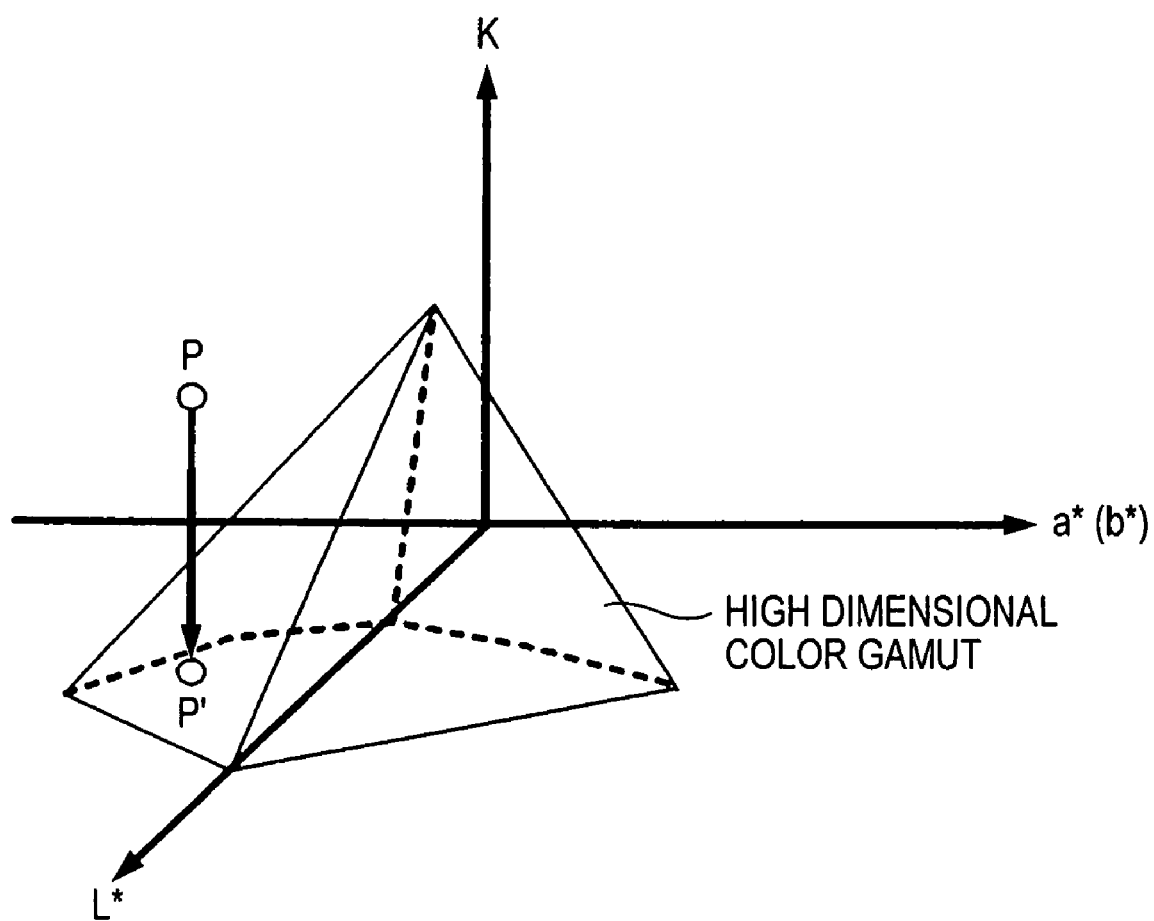
FIG. 14 is a schematic representation when the color gamut compression is executed so as to place importance on reproducibility of L*a*b*.

FIG. 14 is a schematic representation when color gamut compression is executed so as to place importance on the reproducibility of L*a*b* in such a case.

Here, the color gamut compression is executed so as to change only the K value without changing the L*a*b* value. If color is placed outside the color gamut because the K value is inappropriate in the L*a*b*K color gamut, such a method may also be used to execute the color gamut compression.

Figure 15:
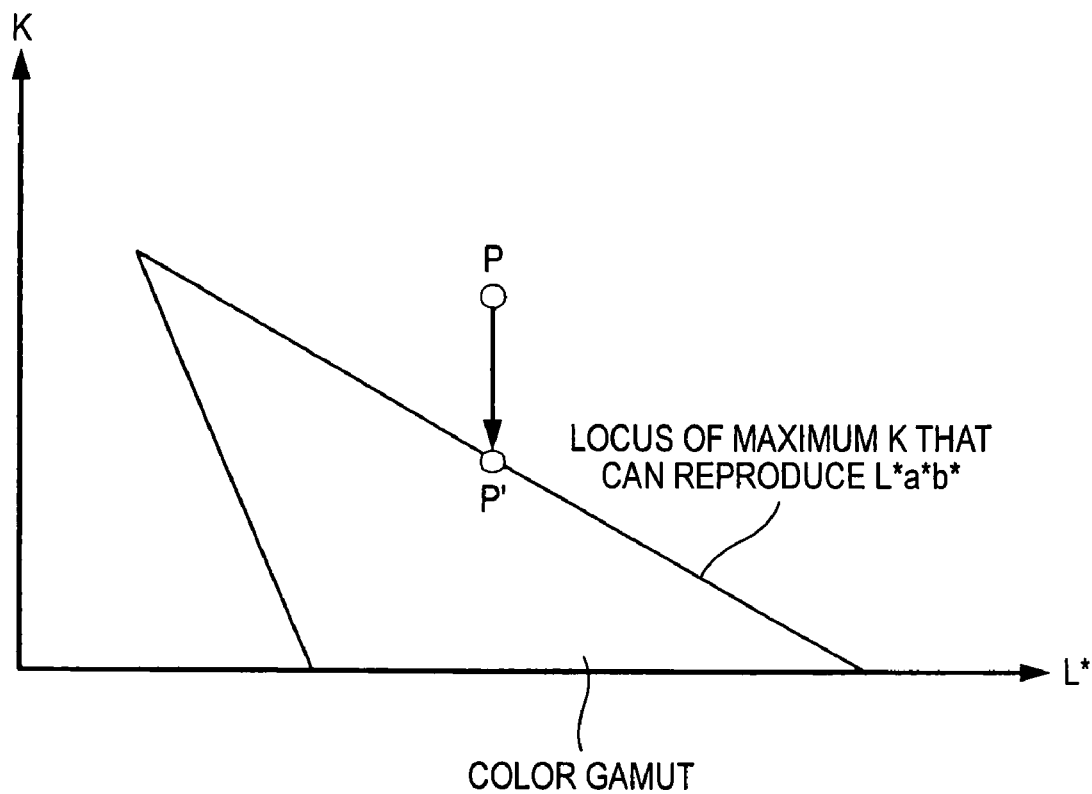
FIG. 15 is a drawing of projecting from an L*a*(b*)K color space onto an L*K color space in the schematic representation of FIG. 14, which shows the color gamut compression.

FIG. 15 is a drawing of projecting from an L*a*(b*)K color space onto an L*K color space in the schematic representation of FIG. 14, which shows the color gamut compression.

FIG. 15 is representation of the color gamut compression shown in FIG. 14 from another viewpoint.

In FIG. 15, the color gamut is represented by spread of L* and K. From such a viewpoint, it is seen that the compression target point in FIG. 15 is outside the color gamut because it exceeds the maximum K (=Kmax) to enable L*a*b* to be reproduced.

Figure 16:
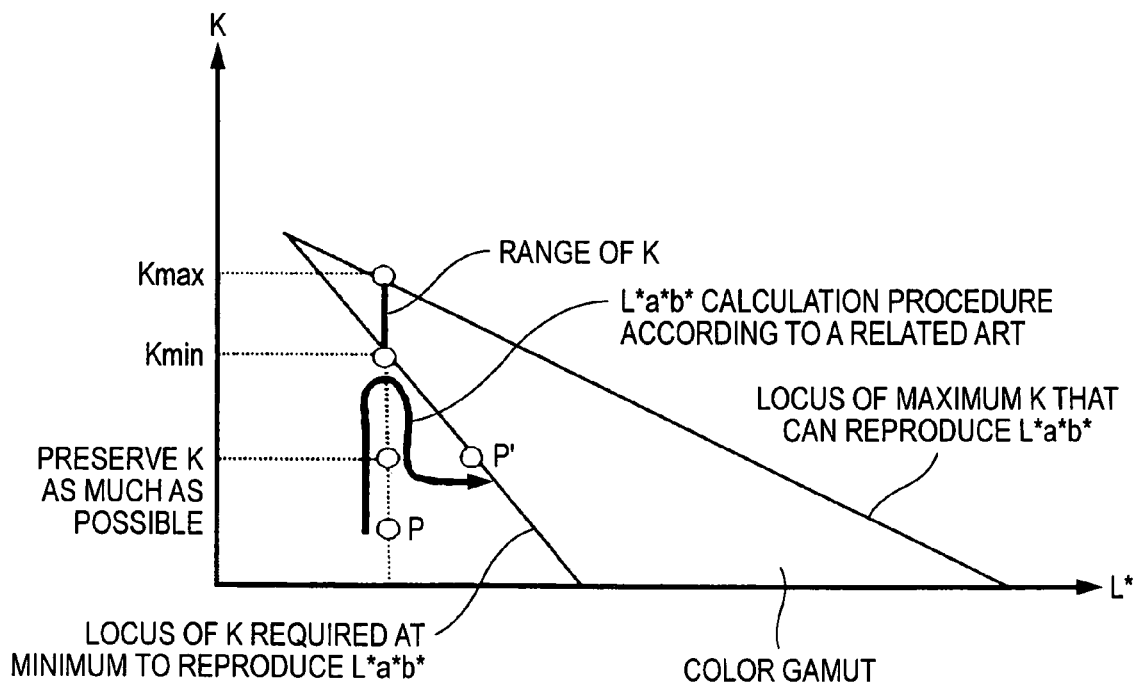
FIG. 16 is a schematic representation to show the locus of the compression target point P in the L*K color space when the color gamut compression is executed by the method of repeating search for L*a*b* and K alternately in a related art.

FIG. 16 is a schematic representation to show a locus of a compression target point P in the L*K color space when the color gamut compression is executed by the method of repeating the search for L*a*b* and the search for K alternately in the related art.

It is assumed that the point P is in a position shown in FIG. 16. In the related art, K required at minimum to reproduce L*a*b* (=Kmin) is calculated as well as Kmax. It is determined as to whether or not K is in the range of Kmin≦K≦Kmax. If K is outside the range, while the values of Kmax and Kmin are referred to, K (preserved K) is found with K before subjected to color gamut compression being preserved as much as possible and a search is made for K falling within the color gamut for use with the preserved K.

Figure 17:
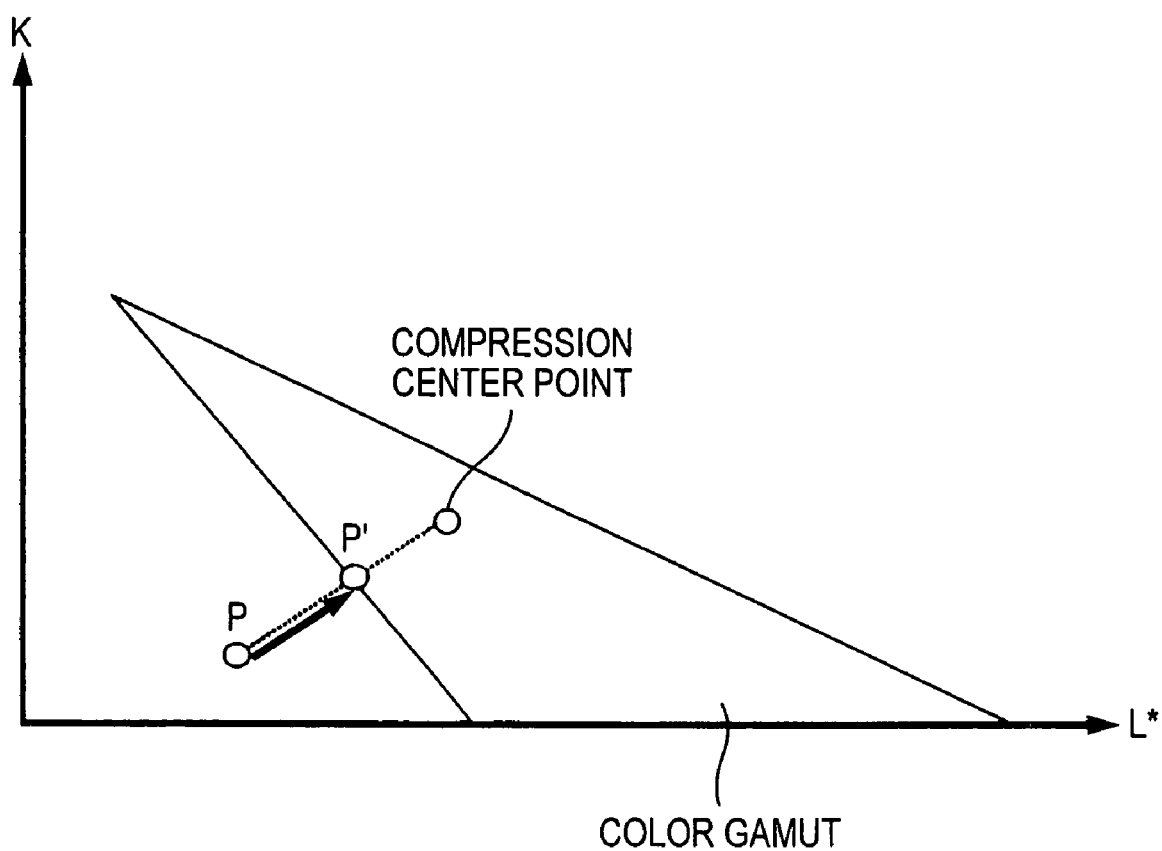
FIG. 17 is a schematic representation to show the locus of the compression target point P in the L*K color space according to the search method used with the color processing apparatus according to the exemplary embodiment of the invention.

On the other hand, FIG. 17 is a schematic representation to show a locus of a compression target point P in the L*K color space according to the search method used in the color processing apparatus according to the exemplary embodiment of the invention.

In this case, a point P' after subjected to the color gamut compression can be obtained smaller number of search times without finding Kmax or Kmin.

The examples of the color gamut compression methods in the high dimensional color space by moving a point on the line toward the compression center point have been described. Further, in the exemplary embodiment, the color gamut compression may also be executed by moving on a curve from the compression target point to the compression center point.

Figure 18:
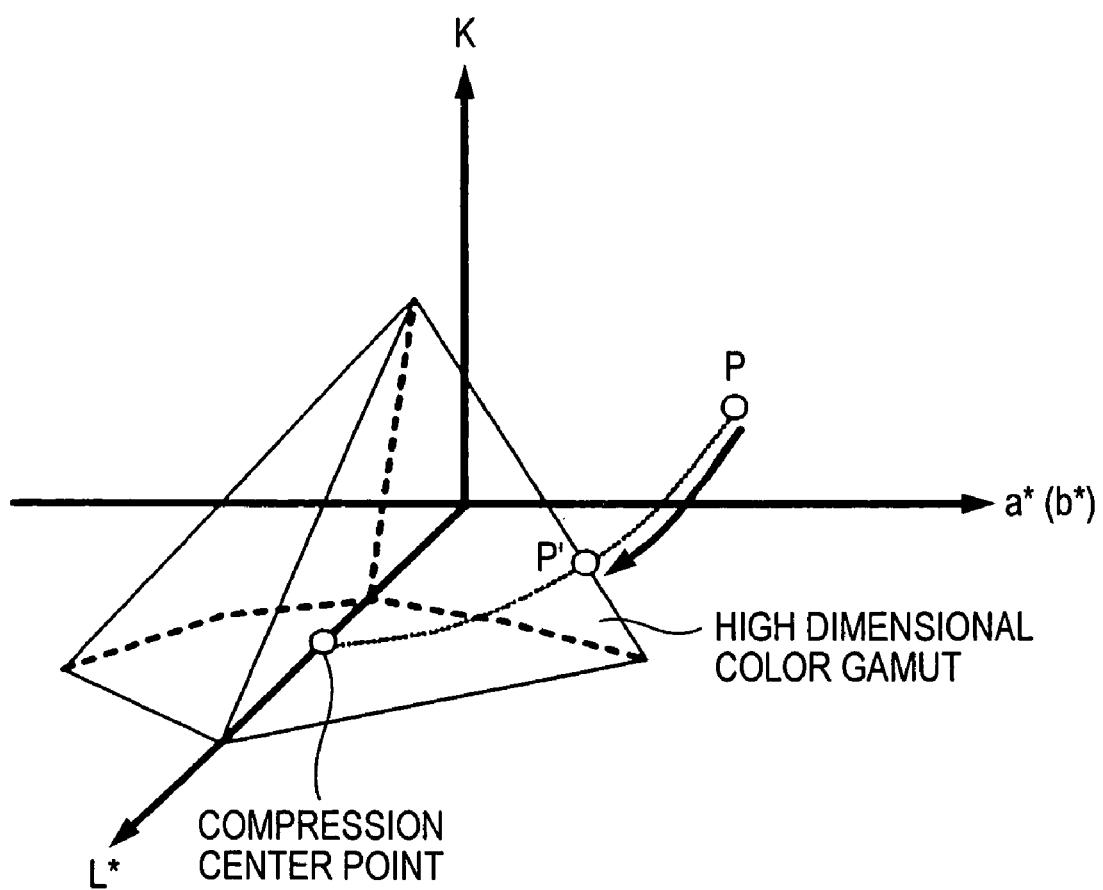
FIG. 18 is a schematic representation for setting one compression center point in the L*a*(b*)K color space and moving a point along a curve from the compression target point to the compression center point, to thereby execute the color gamut compression.

FIG. 18 is a schematic representation for setting one compression center point in the L*a*(b*)K color space and moving a point on a curve from the compression target point to the compression center point, to thereby execute the color gamut compression.

In this case, for example, the compression center point may be set to $(L_0, a_0, b_0, K_0)$. Also, to form a curve, the following expression having nonlinearity obtained by transforming the expression (1) may be used.

$$\begin{cases} L^* = L_o + f_L(t) \\ a^* = a_o + f_a(t) \\ b^* = b_o + f_b(t) \\ K = K_o + f_K(t) \end{cases} \quad (5)$$

where t denotes a parameter and functions $f_L$, $f_a$, $f_b$, and $f_K$ denote nonlinear functions for L*, a*, b*, and K, respectively.

For example, these functions may be defined as a quadratic function such as $$f_L(t) = \alpha_L t^2 \quad (6)$$

($\alpha_L$ denotes a constant) or a logarithmic function, an exponential function, etc., may be used. Alternatively, a polynomial may be used. Any function can be used so long as it is monotonous and nonlinear.

It is assumed that the expression (5) represents the compression center point when t=0 and that the expression (5) represents the compression target point when t=1. In this case, an intersection point between the curve of the expression (5) and the color gamut in the high dimensional color space should exist between 0 and 1 in terms of t. The intersection point may be adopted as the point P' after subjected to the color gamut compression.

The function for use in executing the color gamut compression is changed for each of L*, a*, b*, and K. Thereby, the shape of the curve to the compression center point can be controlled.

Figure 19:
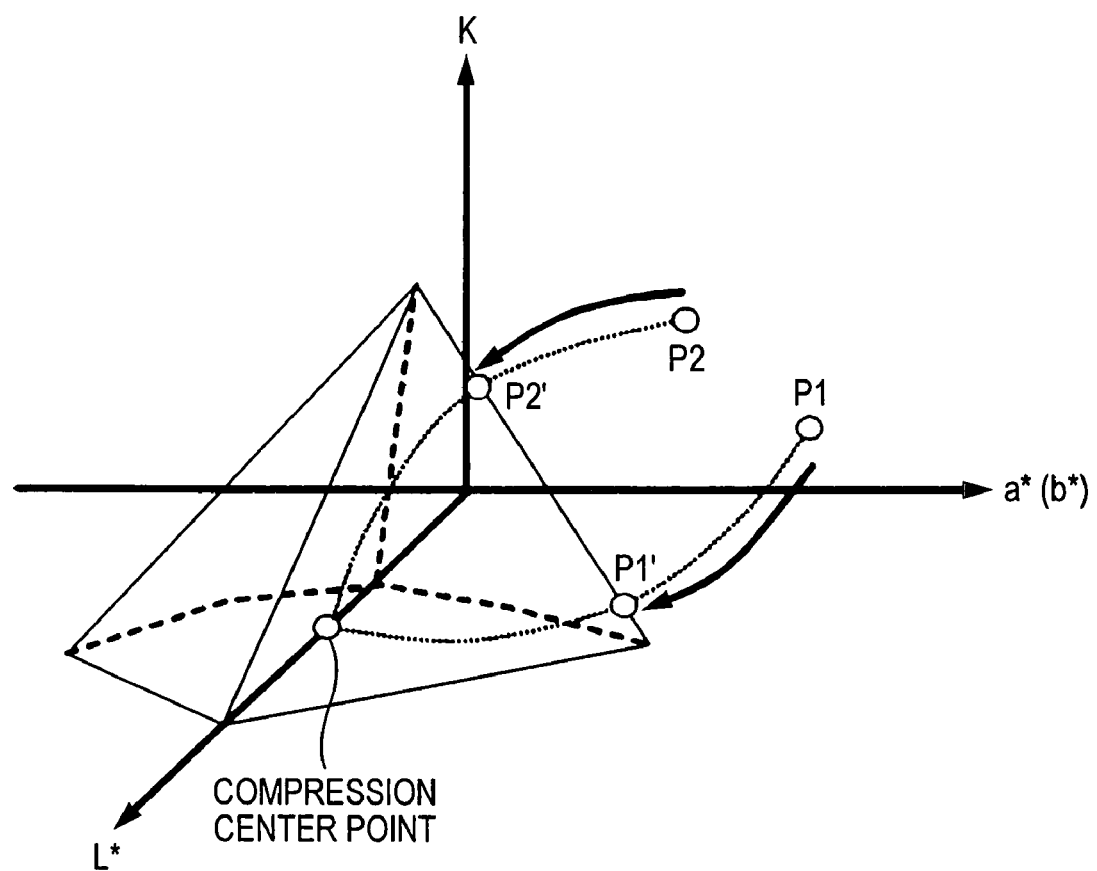
FIG. 19 is a schematic representation for changing the shape of the curve in accordance with the position of the compression target point and executing the color gamut compression.

FIG. 19 is a schematic representation for changing the shape of the curve in accordance with the position of the compression target point and executing the color gamut compression.

As shown in FIG. 19, even if the compression center point is a fixed point, a degree of preservation of K can be controlled in accordance with the compression target point.

The color gamut compression from a point P1 to a point P1' is an example of executing the color gamut compression with importance being placed on preservation of L*a*b*, and the color gamut compression from a point P2 to a point P2' is an example of executing the color gamut compression with importance being placed on preservation of K.

A preservation ratio of K may also be designed relative to L*a*b*, for example.

FIG. 20 is a schematic representation to show an example of designing the preservation ratio of K relative to L*a*b*.

Figure 20A:
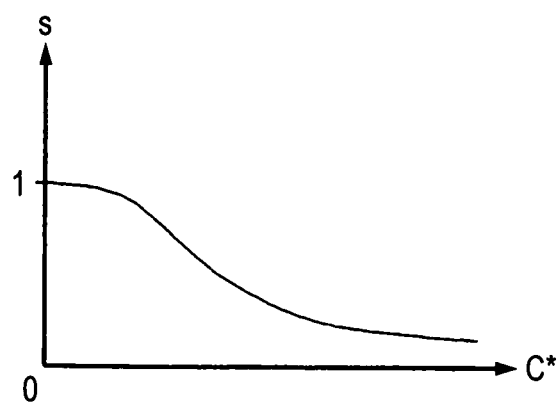
FIG. 20 is a schematic representation to show an example of designing a preservation ratio of K relative to L*a*b*.
Figure 20B:
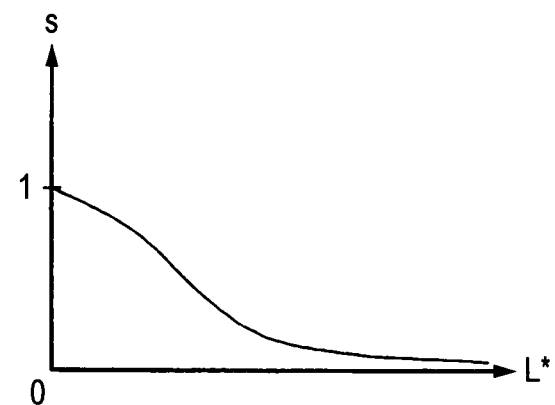

FIG. 20A is a drawing to show a relationship between C* representing saturation and s in the range of 0≦s≦1 (when s=1, complete preservation; when s=0, no preservation) where is the preservation ratio of K. Likewise, FIG. 20B is a drawing to show a relationship between L* representing luminance and s.

Generally, in image quality design, often the K amount is lessened with increase in the saturation, and the K amount is increased with decrease in the luminance.

In the example shown in FIG. 20, this design policy is applied to the preservation ratio of K. While such a graph is referred to, the function for use in executing the color gamut compression may be changed for performing control as shown in FIG. 19.

Further, the color processing apparatus according to the exemplary embodiment of the invention may also be applied to the case where the output color signal is higher in dimension than the CMYK color signal.

For example, the color processing apparatus may be used in the case where a printing machine has a CMYKRGB color signal and the CMYKRGB color signal is color-matched with the color signal of a printer having a CMYKRGB color signal.

Figure 21:
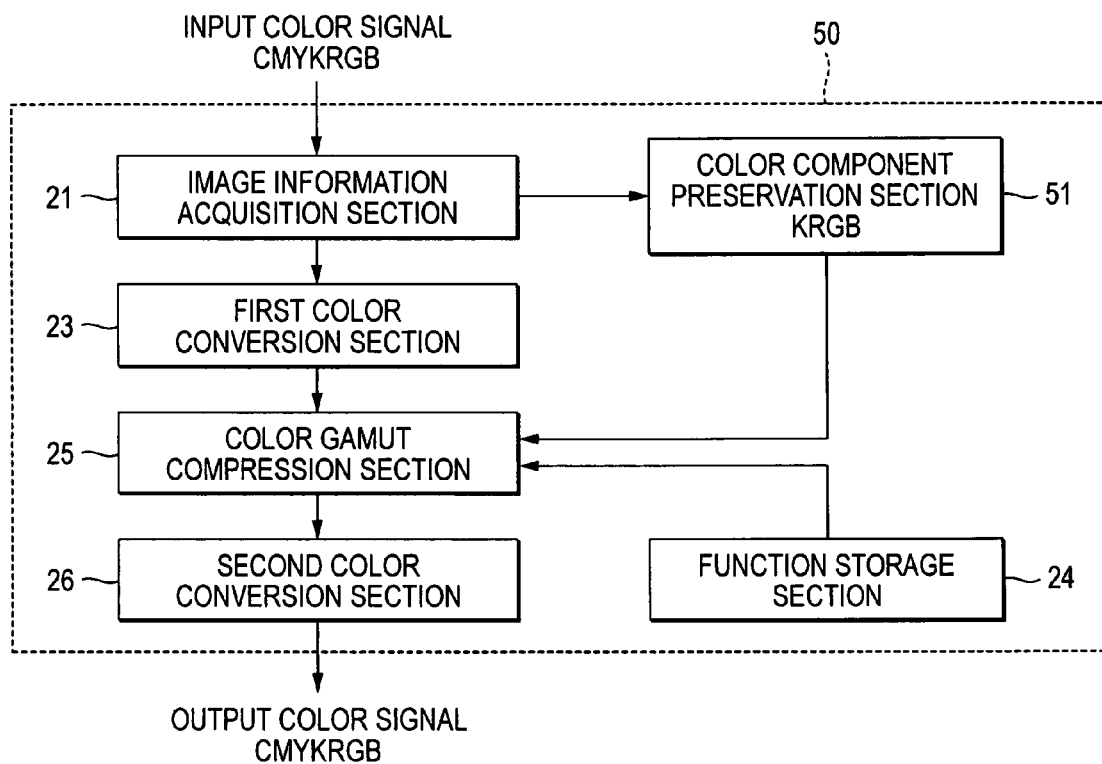
FIG. 21 is a block diagram to show the functions of a color processing apparatus according to the exemplary embodiment of the invention.

FIG. 21 is a block diagram to show the functions of a color processing apparatus 50 according to the exemplary embodiment of the invention in this case.

Figure 22:
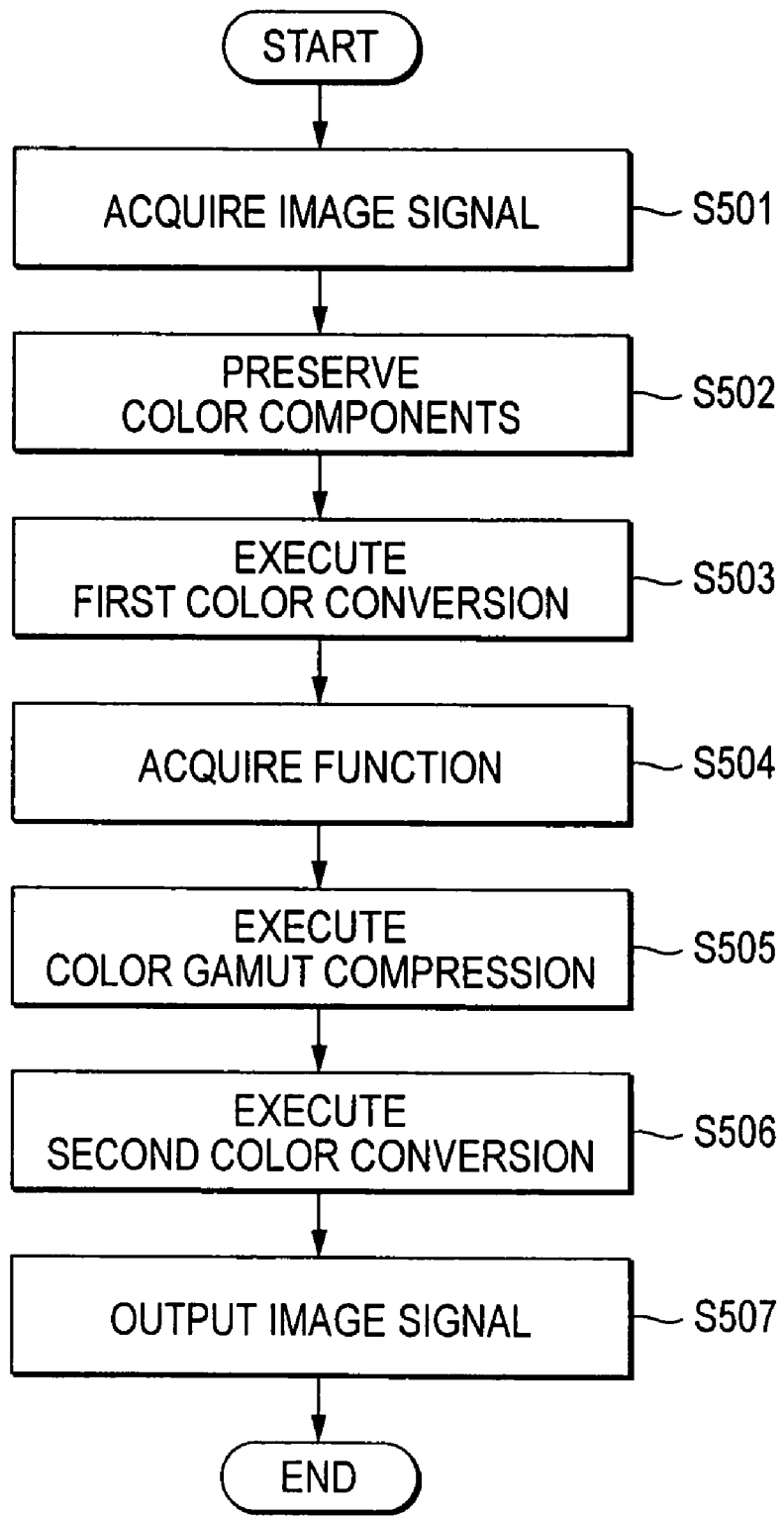
FIG. 22 is a flowchart to show the operation of a color processing apparatus 50.

FIG. 22 is a flowchart to show the operation of the color processing apparatus 50.

The color processing apparatus 50 shown in FIG. 21 has a color component preservation section 51 in place of the black amount preservation section 22 of the color processing apparatus 40 shown in FIG. 8.

The image information acquisition section 21 acquires an image signal having a predetermined input color signal from the external computer (not shown) in a similar manner to that described above (step 501). Here, it is assumed that a color signal including color components CMYKRGB is acquired as the input color signal.

The color component preservation section 51 preserves KRGB which are extra color components of the printing machine (step 502).

Although the color component on which importance is placed varies in response to the requirement, it is assumed that KRGB roughly equivalent to that of the printing machine can be preserved as input to the printer.

K can be preserved as with the color processing apparatus 40 shown in FIG. 8 and RGB may be preserved so that hue and saturation at the time when a color is output by a printer that uses the output color signal, match, for example.

The first color conversion section 23 calculates L*a*b* from CMYKRGB which is a color signal of the printing machine (step 503).

Conversion can be performed according to the following expression with $F_{press}$ denoting a color conversion model of the printing machine as with the expression (2).

$$(L^*, a^*, b^*) = F_{press}(C, M, Y, K, R, G, B) \quad (7)$$

A control section (not shown) reads a function for use in executing the color gamut compression from the function storage section 24 (step 504). The color gamut compression section 25 executes the high dimensional color gamut compression in a seven-dimensional color space L*a*b*KRGB (step 505).

The basic concept is similar to that of the color processing apparatus 40 shown in FIG. 8, and the color gamut compression is executed in the high dimensional color space provided by adding the axes of KRGB to the L*a*b* color space.

Search is made in the high dimensional color space. Thereby, L*a*b* color gamut compression by the color gamut compression section 25 and a CMYKRGB total amount control process can be performed simultaneously as described later in detail.

The second color conversion section 26 executes color conversion of L*a*b* to CMY using L*a*b* after subjected to the color gamut compression, provides an output color signal having CMYKRGB which are the color components of the printer, finally (step 506), and outputs the signal as an image signal (step 507).

Figure 23:
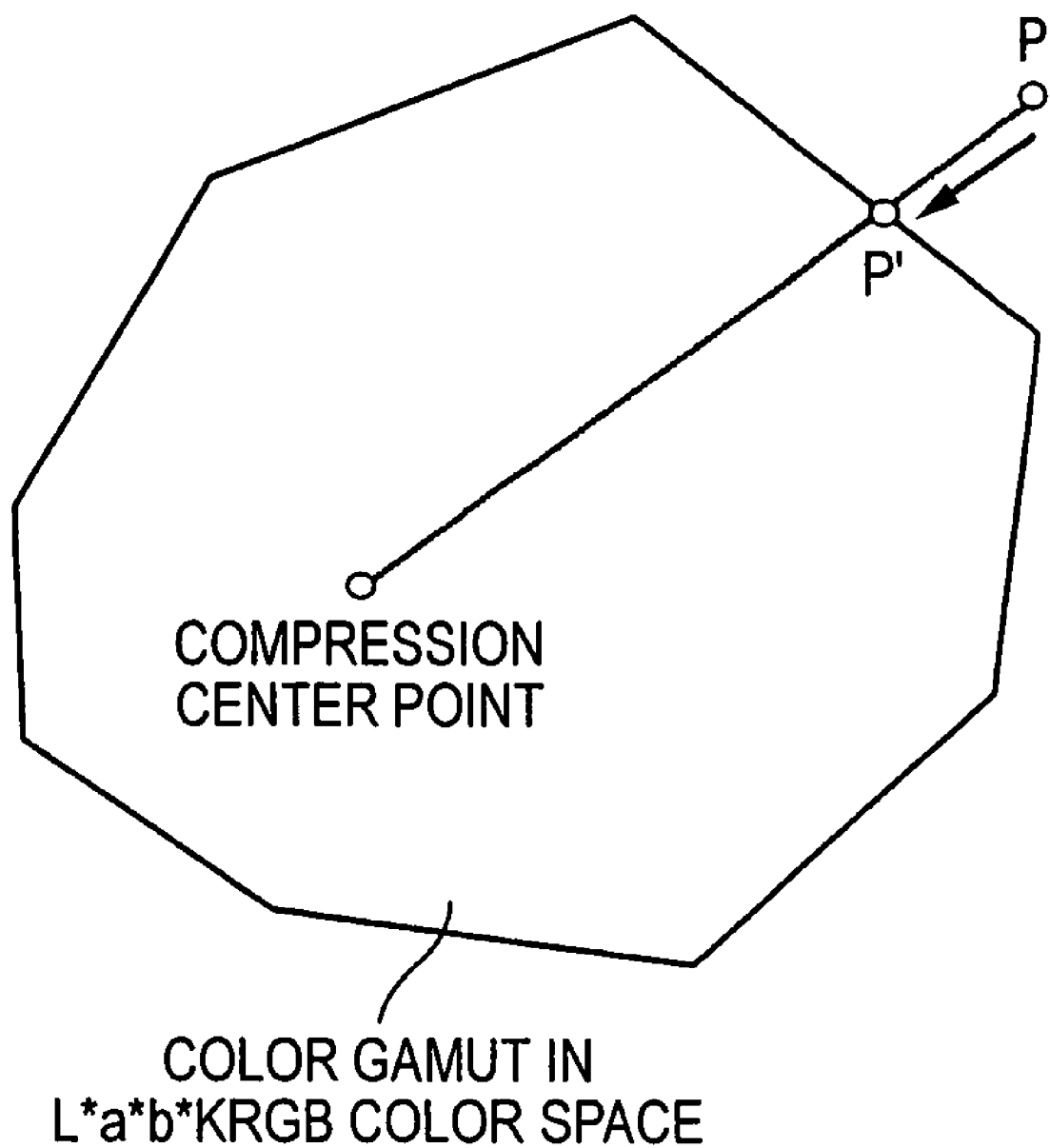
FIG. 23 is a drawing to describe color gamut compression in a seven-dimensional color space of L*a*b*KRGB.

FIG. 23 is a drawing to describe the color gamut compression in the seven-dimensional color space L*a*b*KRGB.

Since drawing of a figure containing the axes would be complicated, only the concept of the color gamut compression in the L*a*b*KRGB color space is shown without describing the axes of the color space.

For example, one compression center point is set. A points is moved on a line from the compression target point toward the compression center point. Thereby, the high dimensional color gamut compression can be executed.

In this case, for example, the compression center point is set to $(L_0, a_0, b_0, K_0, R_0, G_0, B_0)$, and the point is moved on the line represented below. Thereby, the color gamut compression can be executed.

$$\begin{cases} L^* = L_o + \alpha_L t \\ a^* = a_o + \alpha_a t \\ b^* = b_o + \alpha_b t \\ K = K_o + \alpha_K t \\ R = R_o + \alpha_R t \\ G = G_o + \alpha_G t \\ B = B_o + \alpha_B t \end{cases} \quad (8)$$

As with the expression (1), it is assumed that t denotes a parameter to represent the line and $(\alpha_L, \alpha_a, \alpha_b, \alpha_K, \alpha_R, \alpha_G, \alpha_B)$ denote a directional vector from the compression center point to the compression target point.

It is assumed that the expression (8) represents the compression center point when t=0 and that the expression (8) represents the compression target point P when t=1. In this case, an intersection point between the line represented by the expression (8) and the color gamut should exist between 0 and 1 in terms of t, The intersection point may be found and adopted as the point P' to which the compression target point P is moved by the color gamut compression.

In this case, a color conversion model of the printer is $F_{printer}$, and the following expression of an inverse conversion model may be used to search for t so that CMY falls within the signal range.

$$(C, M, Y) = F^{-1}_{printer}(L^*, a^*, b^*, K, R, G, B) \quad (9)$$

If total amount control is applied to the printer, search for t may be executed until the following expression holds true.

$$C + M + Y + K + R + G + B = T \quad (10)$$

as with the expression (4). Here, it is assumed that T is the total amount control value imposed on the printer, which uses the output color signal.

Further, in the exemplary embodiment, the color gamut compression may also be executed by moving on a curve toward the compression center point.

Figure 24:
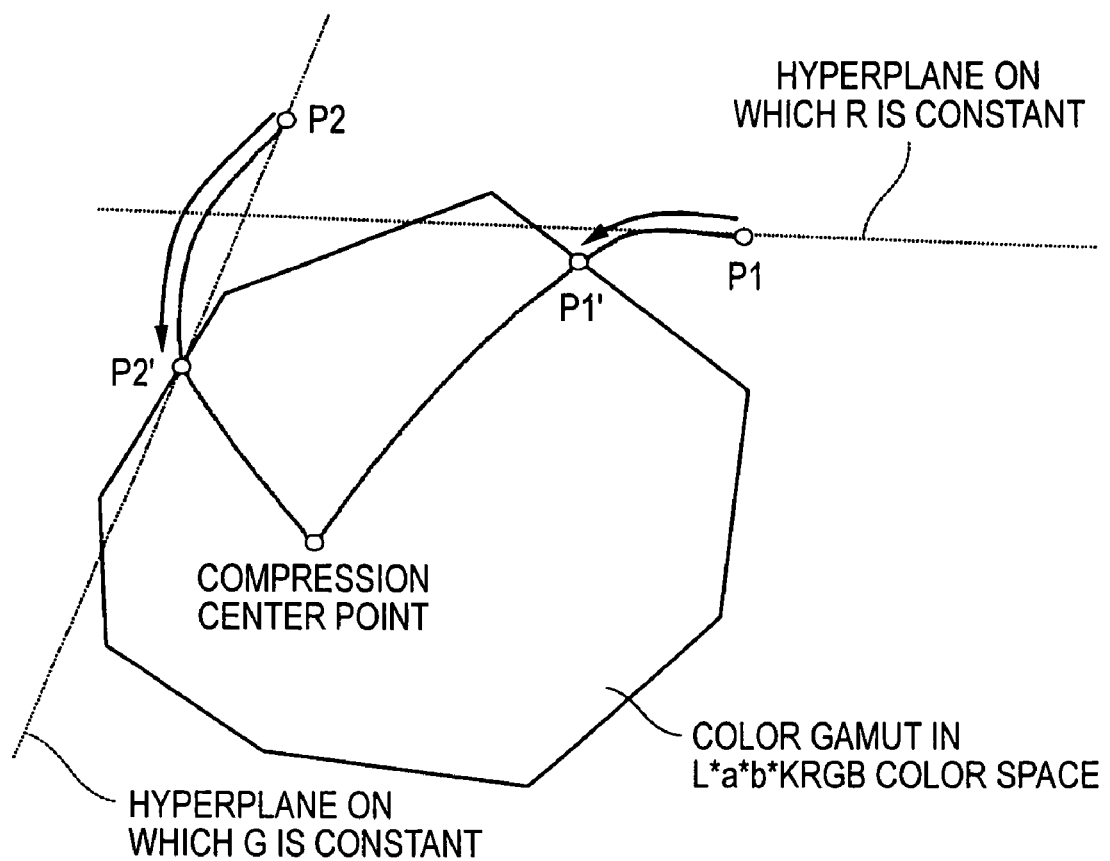
FIG. 24 is a schematic representation for setting one compression center point in the seven-dimensional color space of L*a*b*KRGB and moving a point along a curve from the compression target point to the compression center point, to thereby execute the color gamut compression.

FIG. 24 is a schematic representation for setting one compression center point in the seven-dimensional color space of L*a*b*KRGB and moving on a curve from the compression target point to the compression center point, to thereby execute the color gamut compression.

In this case, the curve can be represented by the following expression as with the expression (5).

$$\begin{cases} L^* = L_o + f_L(t) \\ a^* = a_o + f_a(t) \\ b^* = b_o + f_b(t) \\ K = K_o + f_K(t) \\ R = R_o + f_R(t) \\ G = G_o + f_G(t) \\ B = B_o + f_B(t) \end{cases} \quad (11)$$

where functions $f_L$, $f_a$, $f_b$, $f_K$, $f_R$, $f_G$, and $f_B$ are nonlinear functions for L*, a*, b*, K, R, G, and B, respectively.

As with the expression 6, the function may be defined as a quadratic function or a logarithmic function, an exponential function, etc., may be used. Alternatively, a polynomial may be used. Any can be used if it is monotonous and nonlinear.

The function for use in executing the color gamut compression is changed. Thereby, the direction of the color gamut compression can be controlled.

FIG. 24 shows an example wherein the color gamut compression from a point P1 outside the color gamut to a point P1' is executed so as to preserve the value of R as much as possible if the preservation ratio of R is to be increased.

At this time, the curve may be set so that the R value in the L*a*b*KRGB color space is along the same hyperplane.

FIG. 24 shows an example wherein the color gamut compression from a point P2 outside the color gamut to a point P2' is executed so as to preserve the value of G as much as possible if the preservation ratio of G is to be increased.

At this time, the curve may be set so that the G value in the L*a*b*KRGB color space is along the same hyperplane.

Likewise, to preserve L*a*b*, the curve may be set so as to be along the hyperplane with L*a*b* fixed in the L*a*b*KRGB color space.

The preservation ratios of K, R, G, and B can be designed relative to L*a*b*, for example, and the function for executing color gamut compression can be changed for controlling the color gamut compression.

Figure 25A:
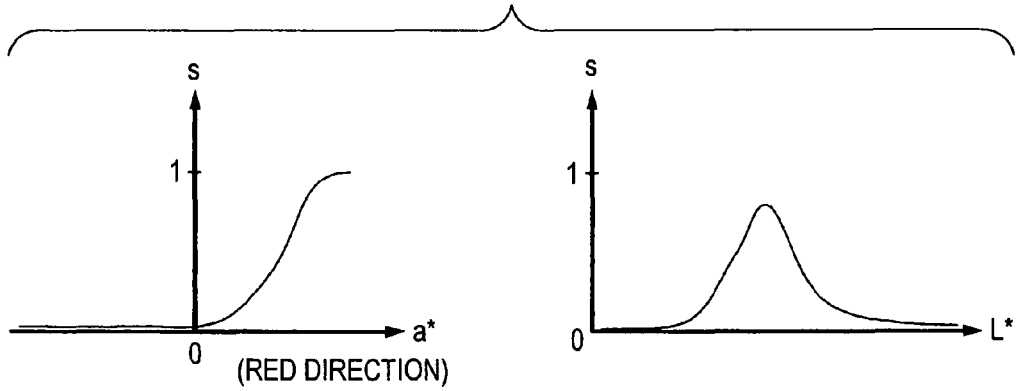
FIG. 25 is a drawing to show an example of designing the preservation ratios of R, G and B relative to L*a*b*.
Figure 25B:
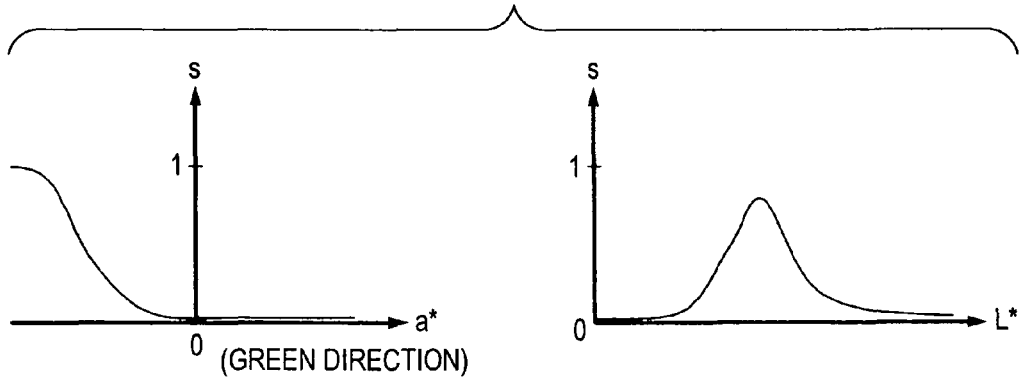
Figure 25C:
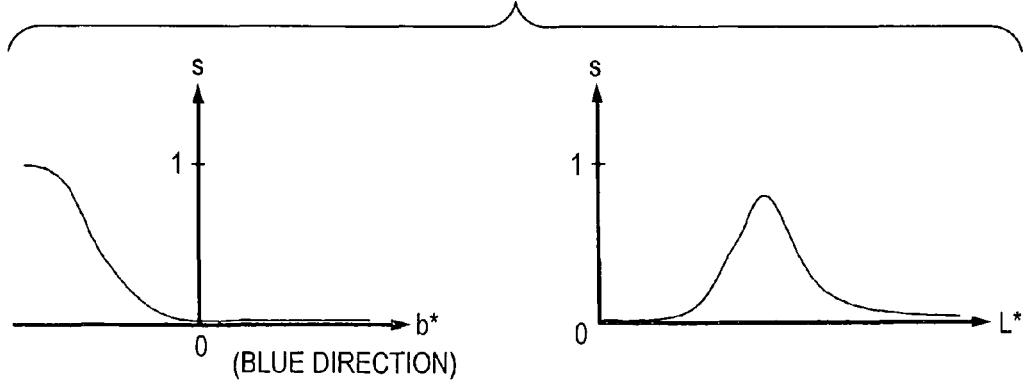

FIG. 25 is a drawing to show an example of designing the preservation ratios s of R, G, and B relative to L*a*b*.

Unlike K, the special colors of the color components of R, G, and B have high saturation and are often utilized in a medium luminance area and therefore settings as shown in FIG. 25 are preferable.

After the color gamut compression is executed as described above, the second color conversion section 26 in FIG. 21 calculates CMY from L*a*b*KRGB which are the compressed color signal.

To calculate CMY, the printer color conversion model of the expression (9) may be used. The CMY thus calculated is CMY so that CMYKRGB satisfies the total amount control and KRGB of print is preserved.

Calculation may be executed in a similar manner regardless of the number of the dimensions of an output color signal of a printer so that a color processing apparatus effective particularly for executing the color gamut compression of a color gamut device having the extra color components of K (black), R (red), G (green), B (blue) in addition to the primary color components of C (cyan), M (magenta), Y (yellow) is provided.

In the description given above, changing the function in response to the position of the compression target point contains not only processing of selecting one of the provided functions in the function storage section in the color processing apparatus in response to the position of the compression target point, but also changing the function shape or the compression center point in response to the position of the compression target point for the function read from the function storage section.

Figure 26:
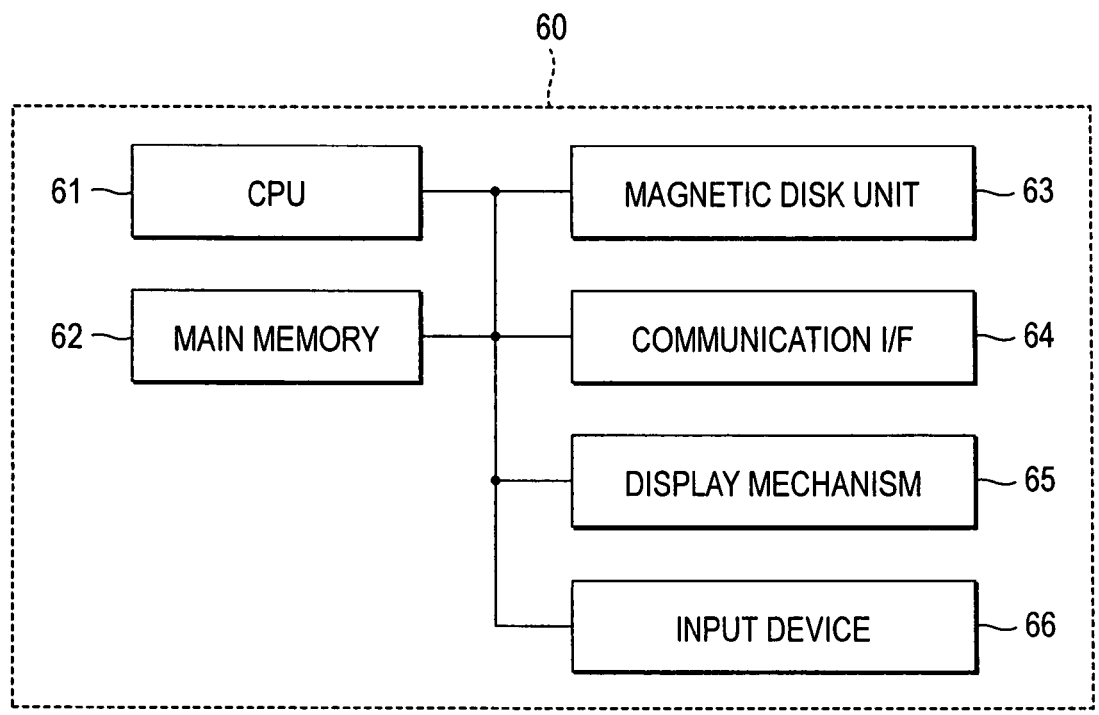
FIG. 26 is a block diagram to show an example of the hardware configuration of the color processing apparatus according to the exemplary embodiment of the invention.

FIG. 26 is a block diagram to show an example of the hardware configuration of a color processing apparatus incorporating the exemplary embodiment of the invention.

A color processing apparatus 60 shown in FIG. 26 includes a CPU (Central Processing Unit) 61 of computation means, main memory 62 of storage means, and a communication I/F 64 for conducting external communications. The CPU 61 executes various types of software such as an OS (Operating System) and applications and implements the functions described above. The main memory 62 is a storage area for storing various types of software, data used for execution thereof, and the like. The communication I/F 64 inputs/outputs an image signal made of predetermined color signals.

The color processing apparatus 60 may further include a magnetic disk unit (HDD: Hard Disk Drive) 63 of a storage area for storing input data to various types of software, output data from various types of software, and the like, a display mechanism 65 implemented as video memory, a display, etc., an input device 66 of a keyboard, a mouse, etc., and the like.

What is claimed is:

1. A color processing apparatus comprising:
an image signal acquisition section that acquires an image signal including an input color signal having predetermined color components;
a color component preservation section that preserves at least one of the color components of the input color signal as a preserved color component;
a first color conversion section that converts the input color signal into an intermediate color signal belonging to a first color space;
a color gamut compression section that performs in a high dimensional color space having at least four axes, a color gamut compression for the intermediate color signal using color components of the intermediate color signal and the preserved color component, to generate a compressed color signal;
a second color conversion section that converts the compressed color signal into an output color signal belonging to a second color space different from the first color space, and
a function storage section that stores a function for use in the color gamut compression, the function passing through a compression target point in the high dimensional color space and a color gamut defined in the high dimensional color space, the high dimensional color space including axes of the color components of the first color space and an axis of the preserved color component, wherein:
the color gamut compression section reads the function from the function storage section, finds an intersection point between the function and the color gamut of the high dimensional color space, and performs the color gamut compression so that the compression target point is converted into the intersection point; and
the color processing apparatus comprises at least one of a CPU, a main memory for storing various types of software, a communication I/F, a magnetic disk unit, a display mechanism, and an input device.

2. The apparatus according to claim 1, wherein the function stored in the function storage section passes through a compression center point set in the high dimensional color gamut.

3. The apparatus according to claim 1, wherein the function used in the color gamut compression section is changed according to a position of the compression target point in the high dimensional color space.

4. The apparatus according to claim 1, wherein the function used in the color gamut compression section is changed according to a color component preservation ratio of the preserved color component.

5. The apparatus according to claim 1, wherein the color gamut compression section performs the color gamut compression so that a sum total of the components of the output color signal fall within a predetermined total amount control value.

6. A color processing method comprising:
preserving at least one of color components of an input color signal of an image signal as a preserved color component;
converting the input color signal into an intermediate color signal belonging to a first color space;

performing in a high dimensional color space having at least four axes, a color gamut compression for the intermediate color signal using color components of the intermediate color signal and the preserved color component, to generate a compressed color signal;

converting the compressed color signal into an output color signal belonging to a second color space different from the first color space;

acquiring a function that passes through a compression target point in a high dimensional color space and a color gamut defined in the high dimensional color space, the high dimensional color space including axes of the color components of the first color space and an axis of the preserved color component; and finding an intersection point between the function and the color gamut of the high dimensional color space, wherein:

the color gamut compression is performed so that the compression target point is converted into the intersection point.

7. A non-transitory computer readable medium storing a program causing a computer to execute color processing, the color processing comprising:

preserving at least one of color components of an input color signal of an image signal as a preserved color component;

converting the input color signal into an intermediate color signal belonging to a first color space;

performing in a high dimensional color space having at least four axes, a color gamut compression for the intermediate color signal using color components of the intermediate color signal and the preserved color component, to generate a compressed color signal;

converting the compressed color signal into an output color signal belonging to a second color space different from the first color space;

acquiring a function that passes through a compression target point in a high dimensional color space and a color gamut defined in the high dimensional color space, the high dimensional color space including axes of the color components of the first color space and an axis of the preserved color component; and finding an intersection point between the function and the color gamut of the high dimensional color space, wherein:

the color gamut compression is performed so that the compression target point is converted into the intersection point.

8. The apparatus according to claim 2, where the function is monotonous and nonlinear.

9. The apparatus according to claim 1, wherein the high dimensional color space is a seven-dimensional color space.

* * * * *